(12) United States Patent
Setrakian et al.

(10) Patent No.: US 7,543,663 B2
(45) Date of Patent: Jun. 9, 2009

(54) BIMODAL CONVEYANCE MECHANISM

(75) Inventors: Mark Setrakian, Los Angeles, CA (US); W. Daniel Hillis, Encino, CA (US)

(73) Assignee: Applied Minds, Inc., Glendale, CA (US)

( * ) Notice: Subject to any disclaimer, the term of this patent is extended or adjusted under 35 U.S.C. 154(b) by 317 days.

(21) Appl. No.: 11/242,753

(22) Filed: Oct. 3, 2005

(65) Prior Publication Data

US 2006/0076167 A1  Apr. 13, 2006

Related U.S. Application Data

(60) Provisional application No. 60/615,257, filed on Oct. 1, 2004.

(51) Int. Cl.
*B62D 57/02* (2006.01)

(52) U.S. Cl. .................................. 180/8.1; 280/28.5

(58) Field of Classification Search ................... 180/8.1, 180/8.6, 8.7; 280/28.5
See application file for complete search history.

(56) References Cited

U.S. PATENT DOCUMENTS

| | | | | |
|---|---|---|---|---|
| 1,167,806 A | * | 1/1916 | Erickson | 305/1 |
| 2,941,846 A | * | 6/1960 | Hall et al. | 305/1 |
| 3,179,431 A | * | 4/1965 | Pikl | 280/5.2 |
| 3,995,909 A | * | 12/1976 | van der Lely | 301/47 |
| 4,648,853 A | * | 3/1987 | Siegfried | 446/448 |
| 5,971,091 A | * | 10/1999 | Kamen et al. | 180/218 |
| 6,308,791 B1 | * | 10/2001 | Spletzer et al. | 180/8.1 |
| 6,481,513 B2 | * | 11/2002 | Buehler et al. | 180/8.6 |
| 6,974,356 B2 | * | 12/2005 | Hobson et al. | 440/13 |
| 7,007,626 B2 | * | 3/2006 | Hobson et al. | 114/312 |
| 7,017,687 B1 | * | 3/2006 | Jacobsen et al. | 180/8.3 |
| 2005/0133280 A1 | * | 6/2005 | Horchler et al. | 180/8.1 |

\* cited by examiner

*Primary Examiner*—Kevin Hurley
(74) *Attorney, Agent, or Firm*—Michael A. Glenn; Glenn Patent Group

(57) ABSTRACT

A virtual wheel provides a leg pair as a conveyance mechanism for a land vehicle. The virtual wheel propels the vehicle across a surface using a repetitive motion of the legs that contact the ground as would a wheel, due to their geometry. Vehicle embodiments include at least two-, three-, four- and six-wheeled vehicles, both transverse and in-line. Additionally, the invention provides a bipedal walking robot. One embodiment provides a robotic mule—a payload-carrying vehicle. The invention combines the flexible mobility of bipedal vehicles with the stability and functionality of very large-wheeled vehicles. Additionally, a bimodal conveyance mechanism readily converts between walking and rolling modes

15 Claims, 28 Drawing Sheets

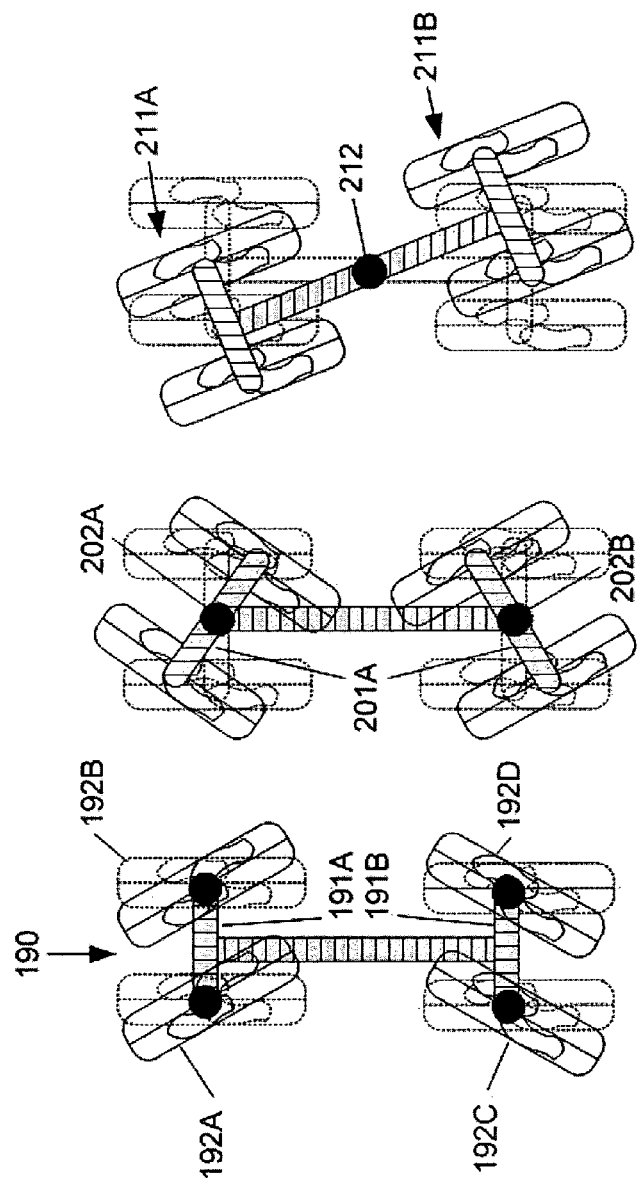
FIGURE 19
FIGURE 20
FIGURE 21
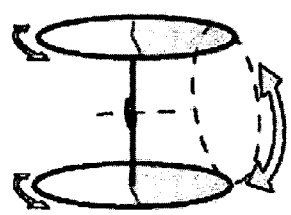
FIGURE 23
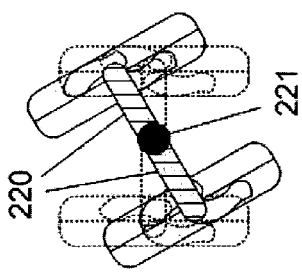
FIGURE 22

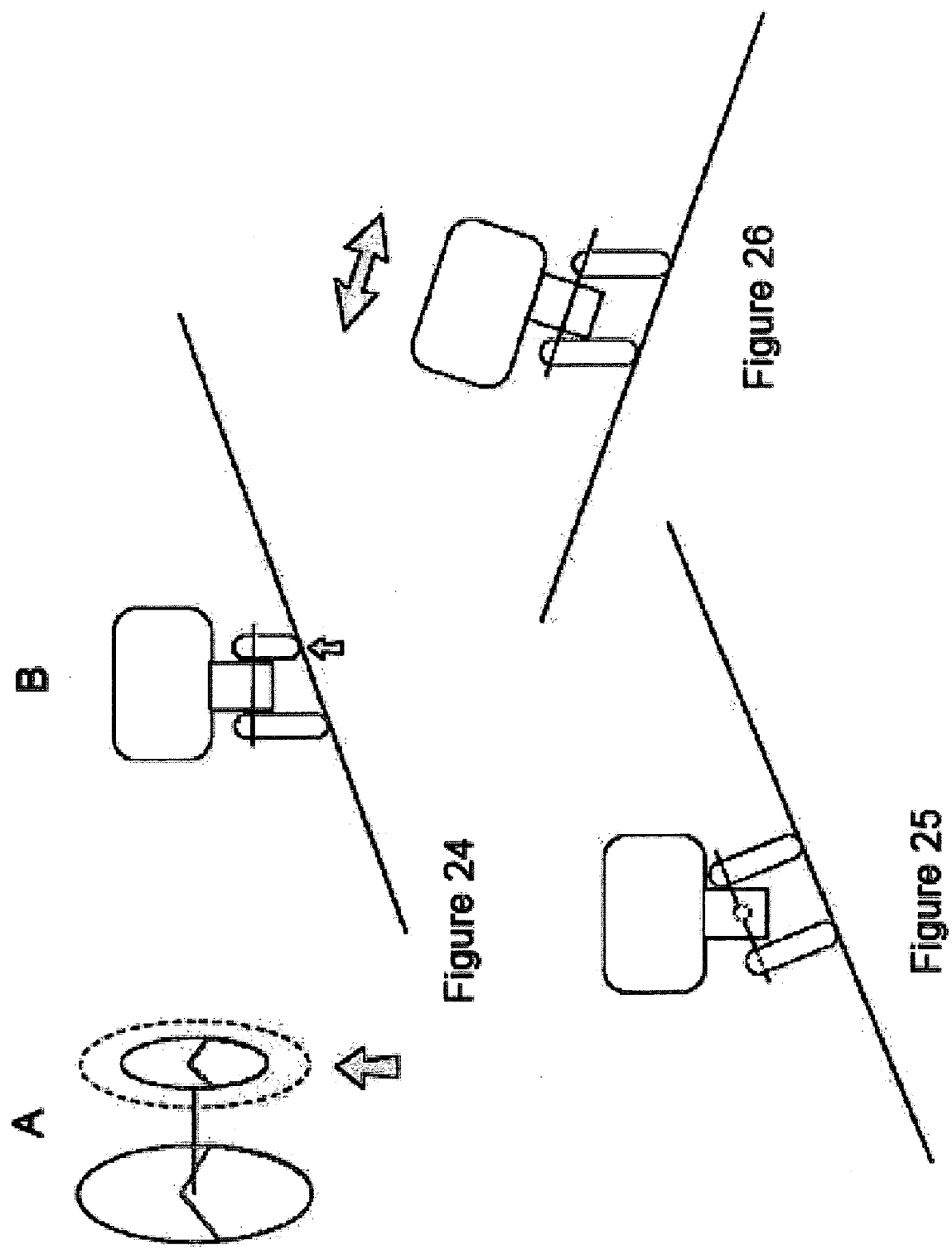

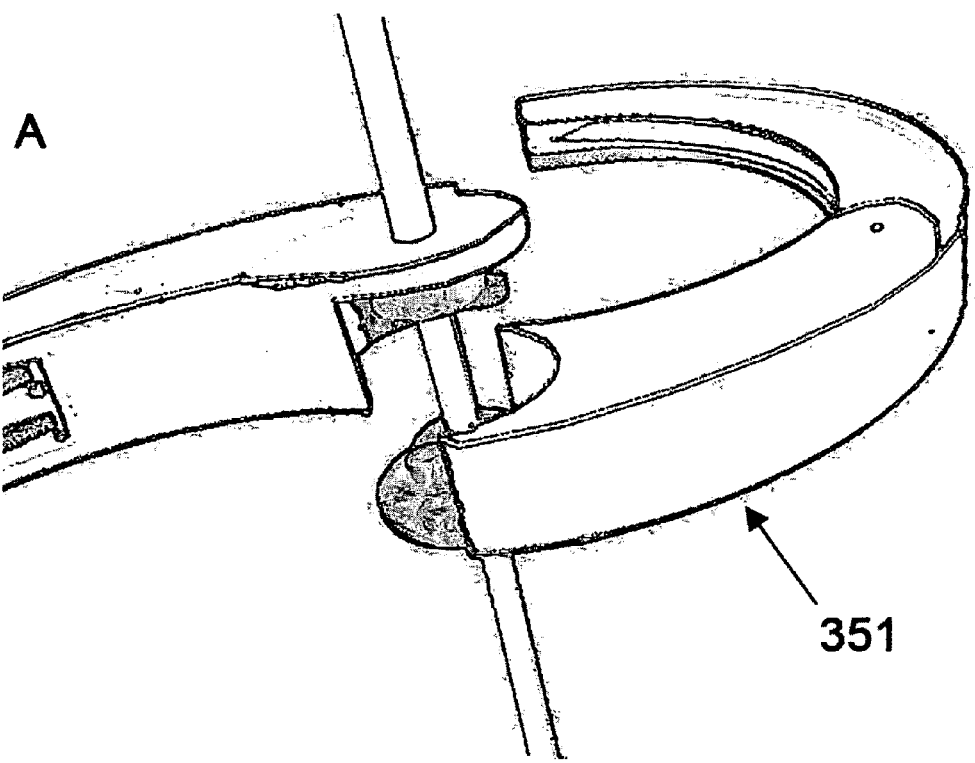
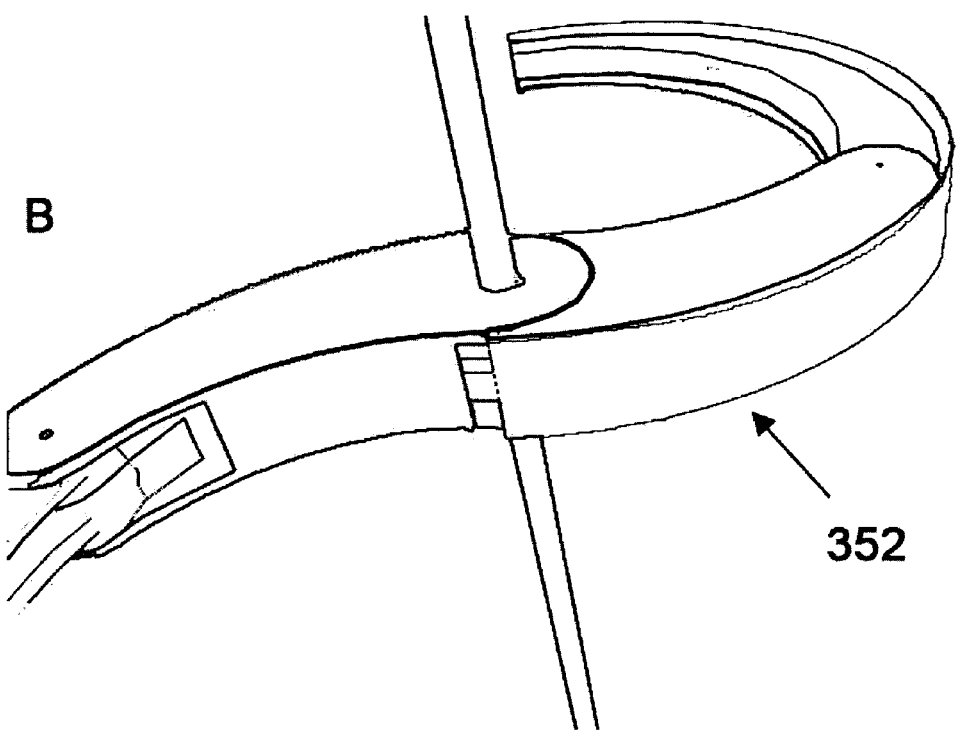
FIGURE 35

BIMODAL CONVEYANCE MECHANISM

CROSS REFERENCE TO RELATED APPLICATIONS

This application claims benefit of U.S. provisional patent application Ser. No. 60/615,257, filed Oct. 1, 2004.

UNITED STATES GOVERNMENT RIGHTS IN THE INVENTION

The United States Government has a paid-up license in this invention and the right in limited circumstances to require the patent owner to license others on reasonable terms as provided for by the terms of contract no. W56HZV-04-C-0686, awarded by the United States Army Tank-Automotive and Armaments Command.

BACKGROUND OF THE INVENTION

1. Field of the Invention

The invention generally relates to the field of land vehicles. More particularly, the invention relates to providing wheel substitutes as the conveyance mechanism in land vehicles.

2. Description of Related Art

Robotic vehicles are an increasingly important area of research and development as the number of uses for these vehicles continues to grow. There are many research and commercialization opportunities in the development of robotic vehicles for use in a variety of terrains and in applications that provide significant restrictions to the size and weight of the vehicle.

Conventionally, conveyance of a vehicle over rough terrain has relied upon the use of either very large wheels or legs. Wheeled vehicles benefit from the inherent simplicity and efficiency of rolling motion.

Legged, walking vehicles provide a practical solution for navigation along narrow pathways; thus much research has focused on design of legged vehicles. Most previous work has been done in the area of bipedal vehicles, quadrupeds, and hexapods. In each of these cases, the leg is either a straight or a jointed element, mimicking in some way human or animal legs. Recent work done in the field of legged robots has resulted in bipedal walkers that are more stable, lighter, and more capable of maneuvering than before.

PREVIOUS APPROACHES

Collins, S. H., Wisse, M., Ruina, A. *A 3-D Passive Dynamic Walking Robot with Two Legs and Knees,* International Journal of Robotics Research, 20 (7): 607-615 (2001) discuss the theory of legged robots, going back to nineteenth-century ramp-walking toys. They point out that, while concepts behind such mechanical devices are centuries old, it is only recently that they have been subjected to rigorous analysis because the necessary computing capability has only recently become available. They cite McGeer's work (McGeer, T., *Passive Dynamic Walking,* International Journal of Robotics Research, 9(2): 62-82 (1990)] on the analysis of passive walking designs. McGeer designed and built a number of passive walkers, but his two-legged devices were unstable due to high yaw. Collins describes a solution to the yaw problem by using swinging arms to afford balance.

Balance issues in bipedal walking robots are quite significant because the robot tends to have just one foot on the ground during a significant portion of the walk. Depending on the duration of this "single support phase" [Miller, W T., *Adaptive Dynamic Balance of Two and Four Legged Walking Robots,* ARPA Progress Report (1996)], different mechanisms are suggested. Where the single support phase is short relative to the time constant of the effective "inverted pendulum" of the bipedal walker, the lifted leg may simply be positioned to take the next step, and many issues are avoided. Where the single support phase is similar to the overall time constant, the walker structure needs to be moved in some way to preserve balance before the robot "falls" onto the other leg. Where the single support phase is longer, the robot needs to be in static balance for a necessary period and then be launched into motion for the next step.

Shibukawa, M., Sugitani, K., Hong, R., Kasamatsu, K., Suzuki, S. Satoki P. N., *The Relationship Between Arm Movement and Walking Stability in Bipedal Walking,* $23^{rd}$ Annual International Conference of the IEEE Engineering in Medicine and Biology Society (2001) discuss the use of arm movements to balance the human body while walking. By measuring and comparing the walking behavior of human subjects who could and could not use their arms for balance, they show that if arm movements are restricted, subjects tend to move their shoulders and upper bodies. Lower walking speeds require less upper body movement than do faster walking speeds.

Kuo, A., *Energetics of Actively Powered Locomotion Using the Simplest Walking Model,* Journal of Biomechanical Engineering, Vol. 124 (2002) and others show that the motion of the swing leg can be largely passive, imposing few power requirements. In his "Simplest Walking Model", where the walker traverses a downward ramp, the mechanical energy consumption is primarily due to the impact when the heel strikes the ground. Thus, one may expect to construct highly efficient walkers.

Most current research on walking robots is being carried out in Japanese universities and industrial settings. Eriksson's survey [Eriksson, B., *A survey on dynamic locomotion control strategies for legged vehicles,* Technical Report TRITA-MMK 1998:1, Dept. of Machine Design, Royal Institute of Technology, S-100 44 Stockholm, Sweden (1998)] on dynamic control of walking robots discusses a number of Japanese institutions, including Gifu University (which uses a hierarchical control system on a number of joints, with local feedback propagating to higher level systems), Tokyo Institute of Technology (where the emphasis is placed on a smooth high speed walk without jerkiness), and Yokohama National University (who have modeled the point of impact when the leg touches the ground), while US institutions working in the field include the Leg Laboratory at MIT (Massachusetts Institute of Technology), which uses virtual controls and virtual actuators to separate the design from the details of the compensatory movements required for balance.

Several bipedal robotic walkers have been designed and built, and all follow the same general principles. Examples include an 1888 patent on a walking toy by Fallis, G. T., *Walking toy,* U.S. Pat. No. 376,588 (Jan. 17, 1888], as well as more recent designs from Collins 2001 and Pratt, J., *Exploiting Inherent Robustness and Natural Dynamics in the Control of Bipedal Walking Robots,* Dissertation, MIT (2000). Multi-legged walkers tend to be different, in that the design constraint is the ability to traverse uneven terrain, rather than maintenance of balance. A good example of this is "Rhex" by Moore E., Campbell, D., Grimminger F., Buehler, M., *Reliable Stair Climbing in the Simple Hexapod "Rhex,"* IEEE Int. Conf. on Robotics and Automation (ICRA) Vol. 3., pp 2222-2227, Washington DC USA (2002), working at McGill University.

Recent and ongoing work being carried out at the California Institute of Technology and the Jet Propulsion Laboratory by Bar-Cohen, Y., *Biologically Inspired Intelligent "Robots" Using Artificial Muscles,* Proceedings of the International Conference on MEMS, NANO and Smart Systems (2003), uses electroactive polymers (EAP) to build artificial muscles for human- and animal-like robots.

At what might be the extreme low end of the scale, nano-technologists at New York University are building a walking robot 10 nm long using fragments of DNA [Hogan, J., *DNA robot takes its first steps,* New Scientist (May 2004)].

The last few decades have witnessed efforts to develop a "robotic mule"—a walking, payload-carrying vehicle that is the modern equivalent of a traditional mule. Previous efforts to build robotic mules have begun with the concept of a real mule and attempted to replicate its functions, a so-called "biomimetic" design approach. Likewise, for centuries, engineers attempted to build a flying machine by emulating the flight of birds. Such efforts were largely unsuccessful. As Bar-Cohen notes, "[S]imple tasks, which are very easy for human[s] and animals to perform, are extremely complex to engineer . . . . " It was only when engineers used a mechanical device, the glider, as the starting point that they produced a successful flying machine. Similarly, patterning robotic mules after live mules has been disappointing. According to Bar-Cohen, adapting natural mechanisms is better done by "mimicking the functional capability rather than fully copying the mechanisms" involved.

Although wheeled vehicles provide the advantages of simplicity and efficiency, large diameter wheels must typically be used to allow rolling over large surface irregularities and to obtain a high clearance between the axle and the ground. The large wheels incur greater cost, possess greater weight, and require greater power from the vehicle. Moreover, maneuverability is significantly compromised, and the profile of the vehicle is increased. While legged, walking vehicles provide a practical solution for navigation along narrow pathways, they raise design and engineering challenges related to balance, stability, speed and payload capacity. There exists, therefore a need in the art for a conveyance mechanism that overcomes the functional disadvantages and deficiencies of both wheels and legs. There further exists a need in the art for a robotic vehicle that overcomes the engineering challenges posed by legged vehicles. Still further, there exists a need in the art for a land vehicles equipped with a wheel substitute as its conveyance mechanism.

SUMMARY OF THE INVENTION

As a novel solution to the above problems, the invention provides a virtual wheel, wherein a virtual wheel provides a leg pair as a conveyance mechanism for a land vehicle. One embodiment of the invention provides a land vehicle equipped with a plurality of leg pairs, each leg pair replacing one of the wheels that would be found on a conventional vehicle. By replacing the four wheels on a conventional land vehicle with four leg pairs, the invention provides a set of very large diameter virtual wheels without the typical consequences of high weight, cost, and mechanical challenges that conventional large wheels bring with them.

In a further embodiment the invention provides a method of propelling a vehicle across a surface using a repetitive motion of legs that contact the ground as would a wheel, due to their geometry.

Additional embodiments incorporating the principles of the invention include:

walking robots; one exemplary embodiment provides a bipedal walking robot;

a transverse two-wheeled vehicle;

a transverse two-wheeled vehicle that allows suspension of payloads below the axle as well as above it;

an in-line vehicle; and three-, four-, and six-wheeled vehicles.

The invention combines the flexible mobility of bipedal vehicles with the stability and functionality of very large wheeled vehicles.

An additional embodiment of the invention provides a family of robotic, legged mules having high ground clearance, enhanced stability, and the ability to navigate very uneven terrain, as well as narrow trails.

An additional embodiment of the invention provides a transverse, two-virtual-wheel robotic mule that draws its own power from a rechargeable battery.

The invention combines the benefits of walking robots and wheeled vehicles by using leg pairs as virtual wheels in a robotic mule design. The invention effectively provides a set of very large diameter virtual wheels without the typical consequences of high weight, cost, and mechanical challenges that conventional large wheels bring with them.

In a further embodiment of the invention, the invention provides a single conveyance mechanism capable of both rolling and walking modes, thus enabling a vehicle equipped with the conveyance mechanism to move across any type of terrain with ease and efficiency.

BRIEF DESCRIPTION OF THE DRAWINGS

FIGS. 19-23 show alternate steering configurations for a virtual-wheeled vehicle according to the invention;

FIGS. 24-26 show alternate mechanisms for load balancing according to the invention;

FIG. 35 shows an assembly for eliminating offset between the members of a virtual wheel according to the invention;

DETAILED DESCRIPTION

Figure 1:
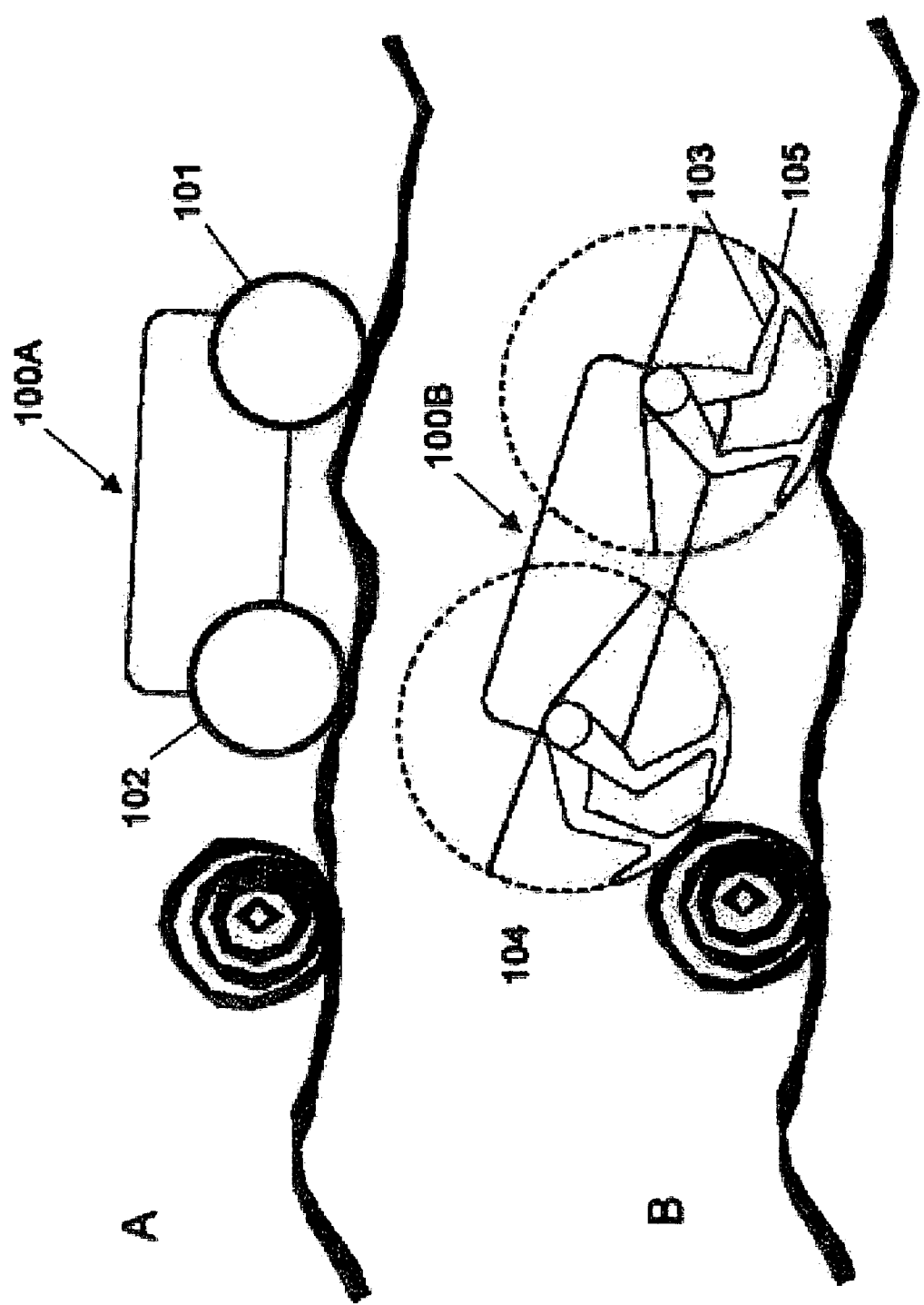
FIG. 1 contrasts a conventional wheeled vehicle encountering an obstacle vs. a vehicle equipped with virtual wheels according to the invention.

The wheel has enjoyed enduring success as a conveyance mechanism for land vehicles, and it has the advantage of at least a century of development of support systems. However, as shown in FIG. 1A, a wheeled vehicle 100a attempting to negotiate an obstacle in its path is readily stopped by the obstacle. Conventionally, the solution to this problem has been to provide vehicles with large-diameter wheels, which permit a vehicle to negotiate obstacles and large surface irregularities and to provide a high clearance between the axle and the ground. The wheel does provide the advantages of simplicity and efficiency. However, large wheels incur greater cost, possess greater weight, and require greater power from the vehicle. Moreover, maneuverability is significantly compromised, and the profile of the vehicle is increased.

As a solution to the disadvantages inherent to large-wheeled vehicles, the invention provides a virtual wheel that utilizes a leg pair. On the vehicle 100b shown in FIG. 1b, the wheels 101, 102 of the wheeled vehicle 100a shown in FIG. 1a have been replaced with leg-pairs 103, 104, wherein a leg pair replaces each wheel. While legged walking vehicles provide a practical solution for navigation along narrow pathways, they raise design and engineering challenges related to balance, stability, speed and payload capacity.

Balance issues in walking robots are quite significant, as the robot tends to have just one foot on the ground during a significant portion of the walk. Various solutions have been proposes to address the balance problem in bipedal robotic vehicles; for example, mechanical designs that increase stability and gyroscopic systems. The invention provides an arrangement of virtual wheels that is intrinsically stable.

As shown in FIG. 1b, the legs of the virtual wheel propel the vehicle 100b across the surface using a repetitive motion of the legs. Due to the geometry—here, the arc of a circle—of the feet 105 of the leg pairs, they contact the ground in the same manner as would a wheel. Thus, the virtual wheel effectively provides a set of very large diameter "virtual" wheels without the typical problems of high weight and cost, and the mechanical challenges that conventional large wheels bring with them.

The range of application of the virtual wheel of the invention is extremely broad. Embodiments incorporating leg pairs as virtual wheels include, but are not limited to;

bipedal walking robots;

in-line vehicles such as bicycles; and transverse vehicles.

Transverse or in-line embodiments include three-, four-, and six-wheeled vehicles. One embodiment provides a payload-bearing vehicle wherein a wheelchair-like design permits suspension of payloads above and below the axle. Accordingly, the invention combines the flexible mobility of bipedal vehicles with the stability and functionality of very large-wheeled vehicles. The principles of the invention may be extended to a family of robotic, legged mules having high ground clearance, high maneuverability, enhanced stability and the ability to navigate very uneven terrain, as well as narrow trails.

Figure 2:
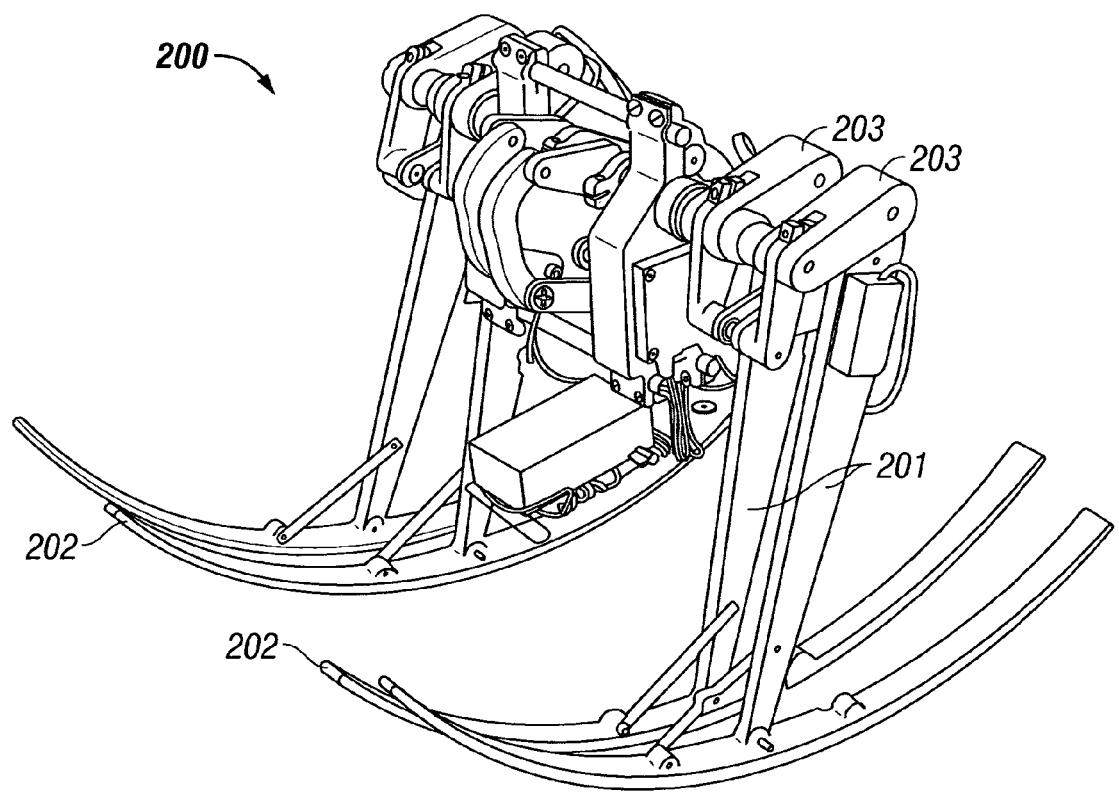
FIG. 2 depicts a two-virtual-wheel robotic mule according to the invention.
Figure 3:
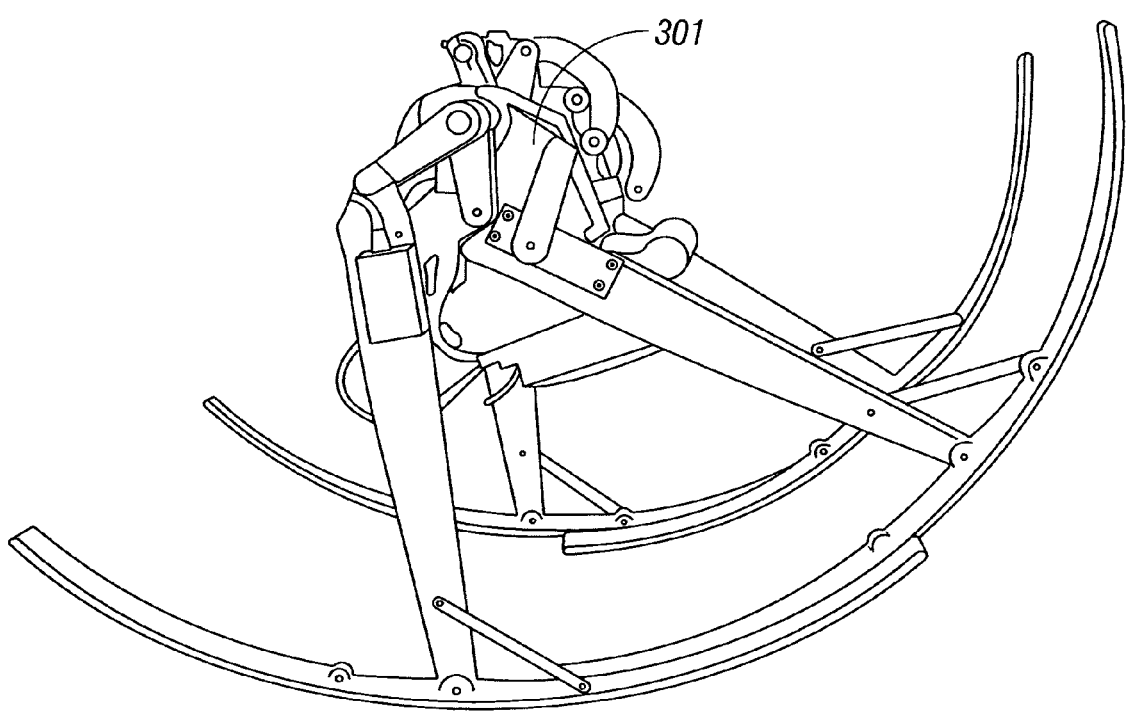
FIG. 3 depicts the robotic mule of FIG. 2 in stepping mode according to the invention.

Turning now to FIG. 2, an embodiment of a two-virtual wheel robotic vehicle 200 is shown. In the current embodiment, servo-actuators 203 provide direct control of the leg pairs 201. The use of servos provides fine control of leg position. Preferably, the clamps of the servo arm linkage are fabricated from a high-stability material such as aluminum, which promotes strength and durability and minimizes slippage. The servos themselves are controllable by means of control software and a central pattern generator. More will be said about control of the invented vehicle below. As described previously, feet 202 whose shape traces the arc of a circle are moved and controlled with ease. FIG. 3 shows the robotic mule of FIG. 2 in stepping mode.

As will be described below, other embodiments of a robotic vehicle such as a mule may include a variety of foot shapes and materials and back throw mechanisms, such as retraction, jointed knees, lateral movement, and so on. Mechanical arrangements of legs, including the standard bipedal robot, inline and transverse arrangements of two virtual wheels, and configurations using two, three, four and more virtual wheels may be utilized.

Figure 4:
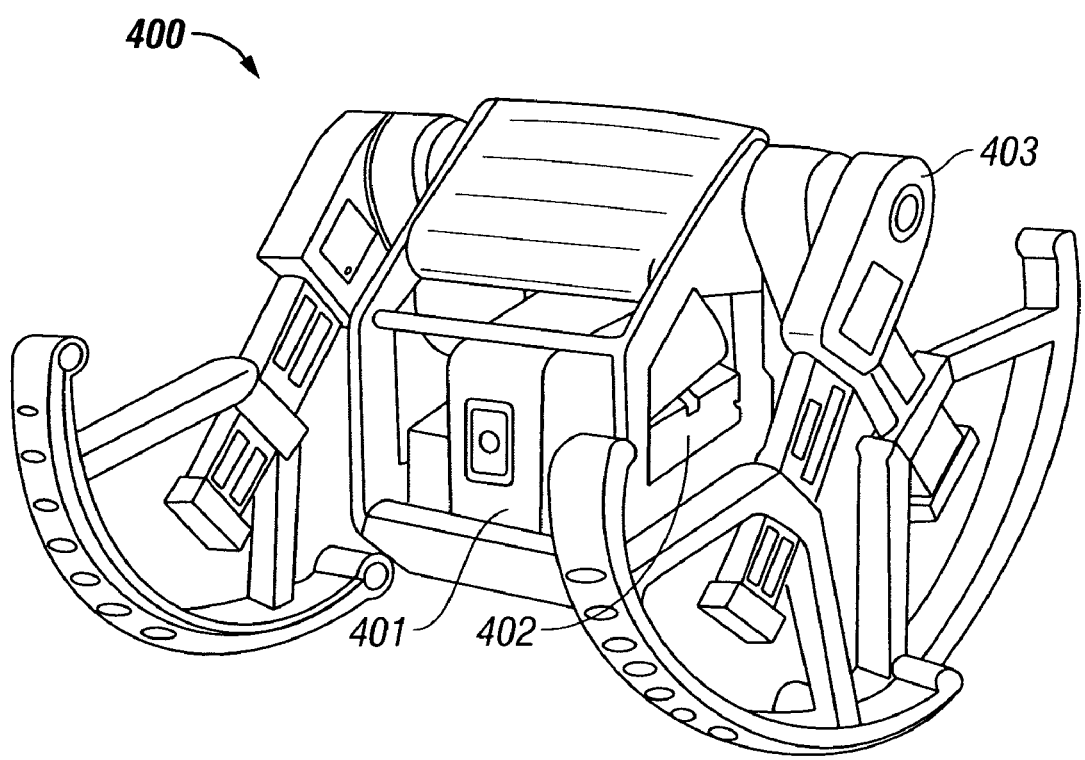
FIG. 4 illustrates a land vehicle having virtual wheels composed of leg pairs as the conveyance mechanism according to the invention.

Using the principles of the invention, it is possible to provide high-payload vehicles capable of being deployed in constrained environments such as narrow trails: for example, transversely mounted two-wheeled vehicles with the payload carried between the two virtual wheels. FIG. 4 shows just such an embodiment. As shown in FIG. 4, the control function of the servo-actuators of FIG. 2 is performed by cams and gears 403. As shown, the vehicle carries a generator 401 and an alternate power source; for example, a small, rechargeable battery 402. Fuels such as diesel or gasoline may power the generator. The battery is used when noise levels are required to be low, for example, in military applications, when the noise from the generator would reveal a combat unit's position to the enemy. The battery is recharged from the generator as required. In addition, the vehicle can carry an additional payload by having it placed over the generator.

The design requires no power to maintain a stationary posture, and only requires power to move. Further, the mechanical design is aimed to be as simple as possible, minimizing the need for power. The invention may use an internal-combustion engine, but various options to power the robotic vehicle are possible. Other power sources are entirely consistent with the principles of the invention. For example, fuel cells utilizing compressed hydrogen are an attractive alternative because they produce little noise, heat or pollutants. Additionally, a purely electrical mode of operation based on storage batteries is possible.

Figure 6:
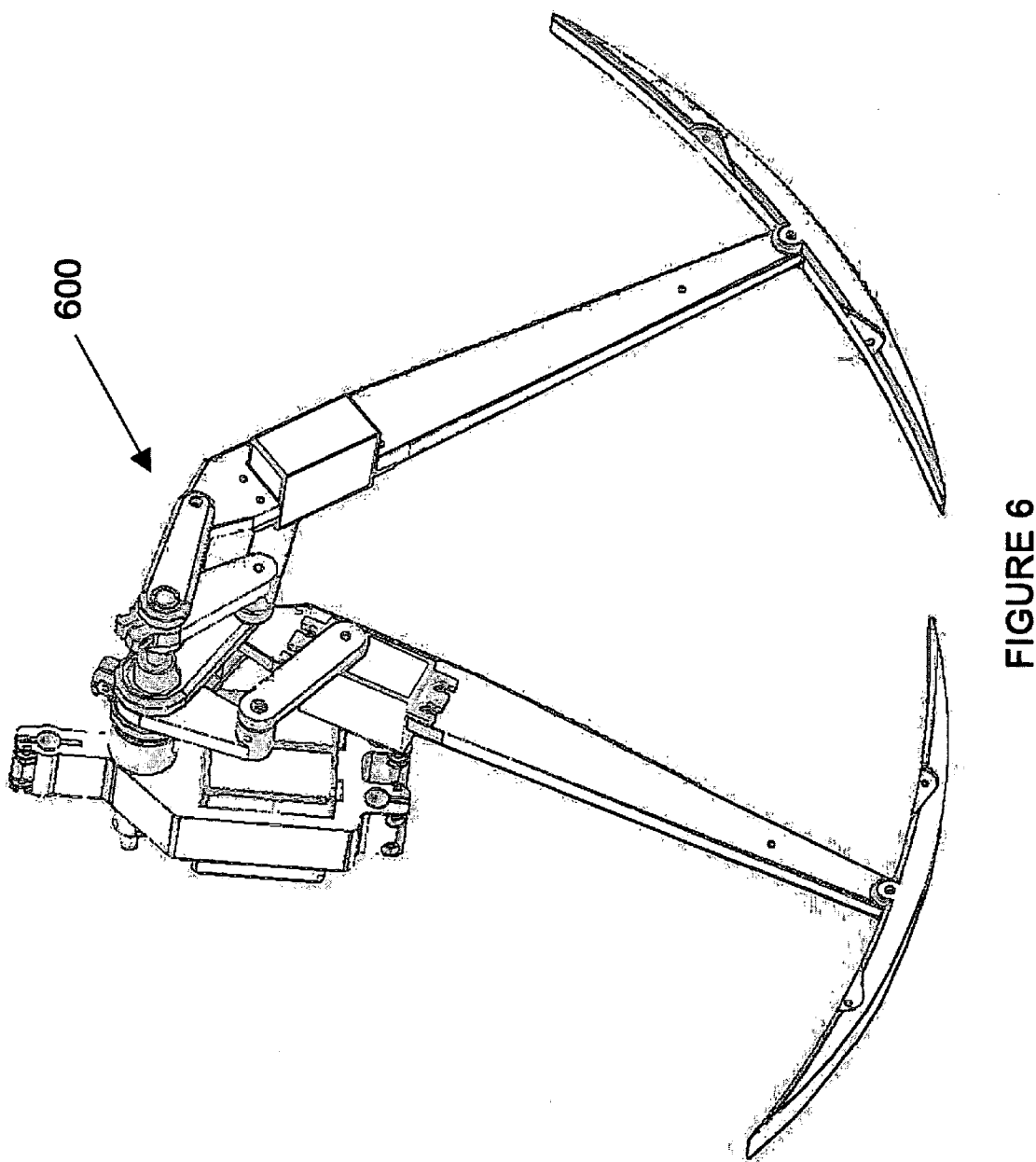
FIG. 6 depicts a single leg pair from the vehicle of FIG. 4 according to the invention.

FIG. 6 shows a leg pair 600 from the embodiment of FIG. 4. The invention may be fabricated from a variety of materials. The parts of the present embodiment are variously fabricated from polycarbonate plastic, steel and carbon fiber. Other materials providing the request requirements of strength, toughness and light weight would also be appropriate. For example, the robotic vehicle could be fabricated from any of:

chromoly steel;
high-performance carbon steel;
5000-7000 series aluminum alloys;
polycarbonate; and
6-4 titanium.

The practitioner having an ordinary level of skill in the art will be guided by certain design imperatives in the selection of fabrication materials. For example, while high performance aluminum and steels are well suited to the invention, because one of the deployments anticipated for the invention is by military units in combat situations, it is preferable to avoid use of materials that are unusual, hard-to-obtain or prohibitively expensive. Furthermore, selection of material for the legs will be guided by the goal of keeping the leg weight as low as possible to facilitate the reciprocating motion of the legs. Another guiding principle is to provide ease of manufacturing and reparability in field applications. Another guiding principle is the requirement that the vehicle be highly resilient, due to the uncontrolled environments in which it is likely to be deployed.

Virtual Wheel Configurations

Figure 5:
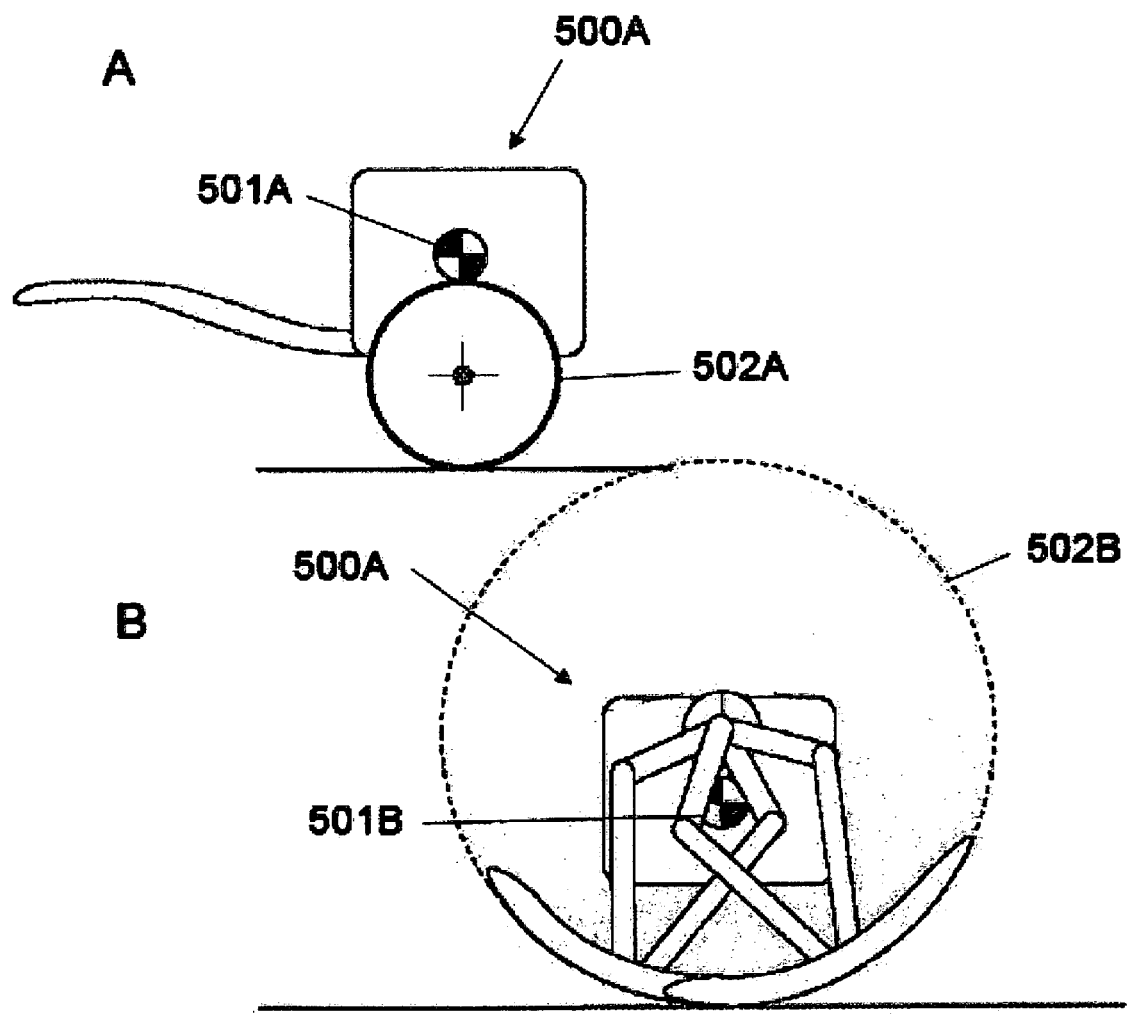
FIG. 5 compares a conventional wheeled cart to a two-virtual-wheel robotic vehicle to show the lower center of gravity and the larger effective diameter of the virtual-wheeled vehicle according to the invention.

The invention may incorporate two, three, four or more virtual wheels. FIG. 5 compares a conventional two-wheeled cart 500a to a two-virtual-wheel robotic vehicle 500b to illustrate the relationship between center of gravity 501 and wheel diameter 502 in each vehicle. By comparing the conventional wheeled vehicle with the virtual-wheeled vehicle, it is readily discerned that the conventional vehicle has a higher center of gravity 501a and a smaller wheel diameter 502a. One of ordinary skill will readily appreciate that the maneuverability provided by the larger effective wheel diameter 502b of the virtual-wheeled vehicle 500b can only be obtained in a conventional wheeled vehicle by sacrificing the exceptional stability and the low profile made possible by the lower center of gravity provided by the virtual-wheeled vehicle.

A two-virtual-wheeled configuration as shown in FIG. 5 provides particular advantages. Among them:

flexibility: the two-virtual wheel design is capable of negotiating constrained areas; multiple units may be connected to each other to form a train, and manual assistance is possible to extend the effective range; and
size: a two-virtual wheel vehicle is smaller, which is advantageous in the context of a robotic vehicle.

Figure 42:
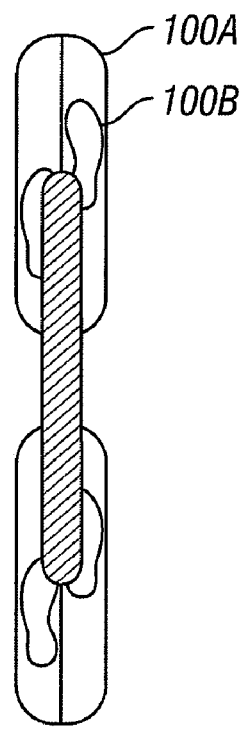
FIG. 42 shows a vehicle that includes virtual wheels in an inline configuration.
Figure 43:
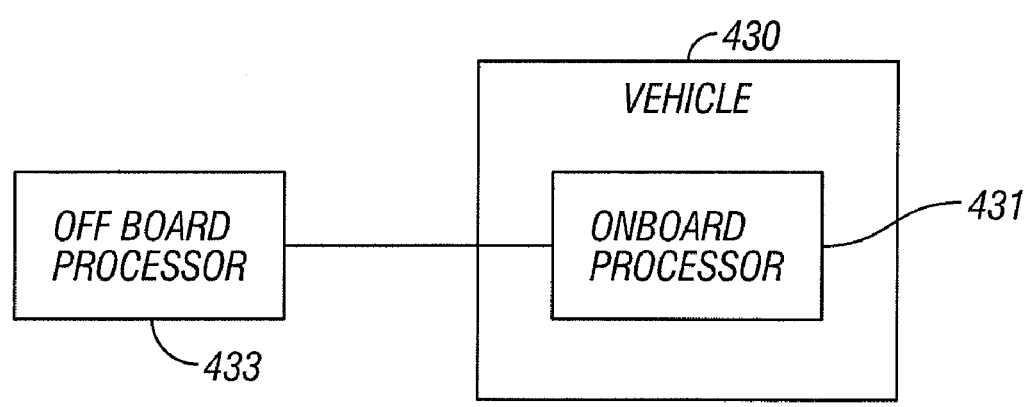
FIG. 43 shows a block diagram of an onboard processor and an offboard processor connected via a wired connection.

An embodiment providing an in-line, two-virtual-wheeled vehicle, shown in FIG. 42, similar to a bicycle allows passage through narrow trails with the payload held lengthwise between the virtual wheels. FIG. 42 shows the effective diameter 100A of the virtual wheel and the actual size of the contact surface of the foot 100B of the virtual wheel, as described in detail herein below.

Figure 7:
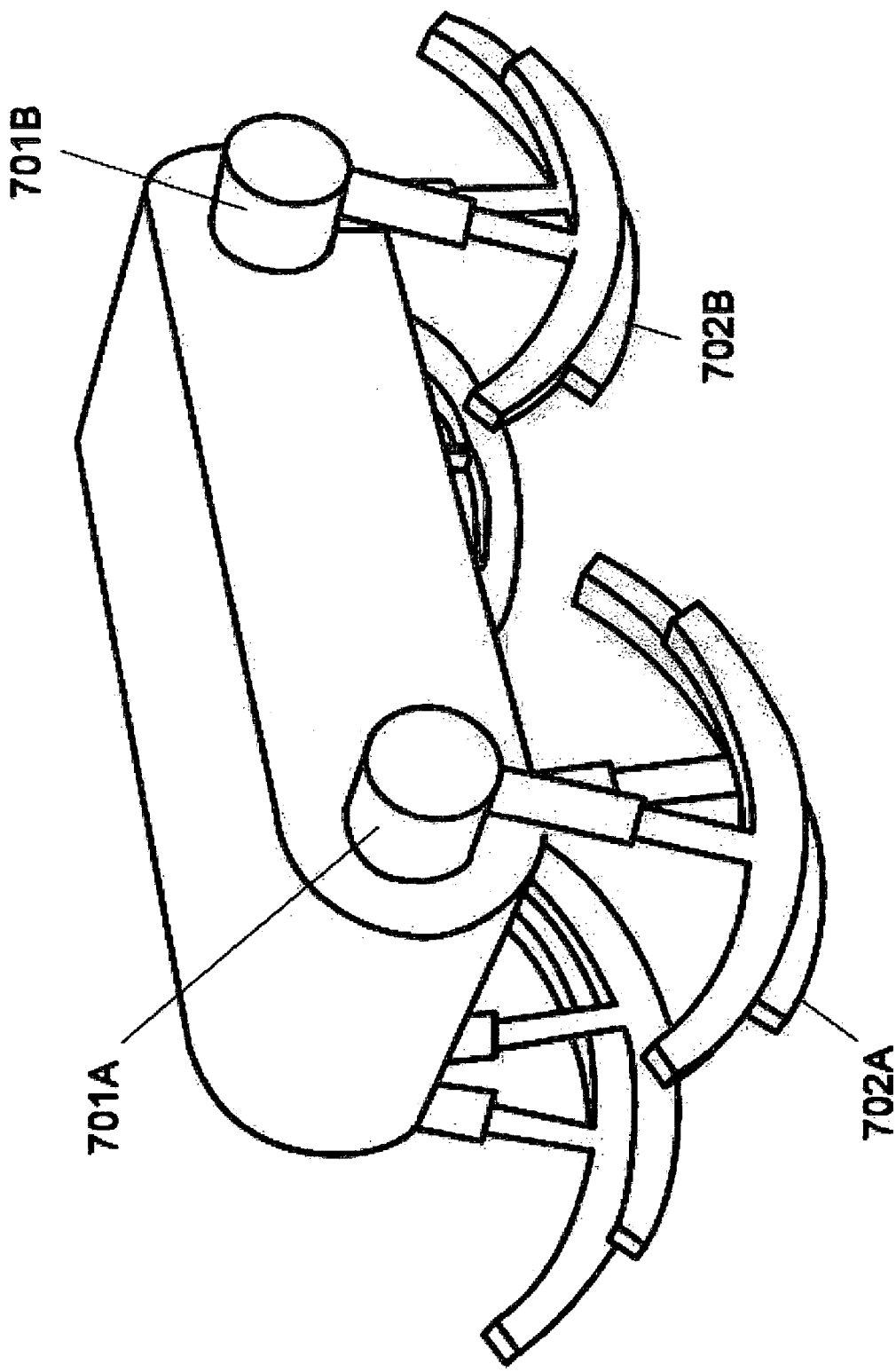
FIG. 7 shows a four-virtual-wheeled vehicle according to the invention.
Figure 11:
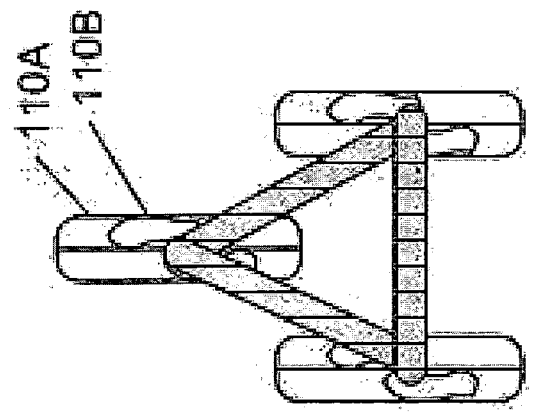
FIGS. 8-11 show alternate virtual-wheel configurations for a vehicle according to the invention.
Figure 10:
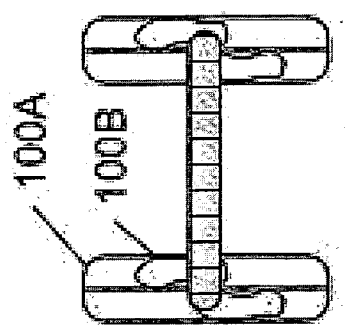
Figure 9:
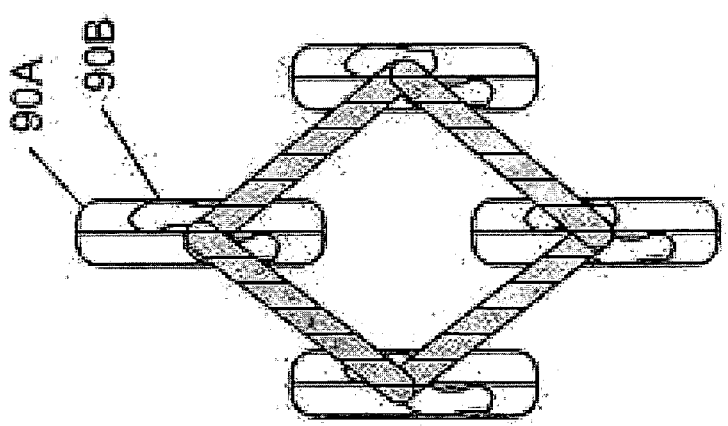

Many additional wheel configurations are possible for the robotic vehicle, with inline and transverse designs each having distinct advantages. With four or more wheels, there are several choices in placement. A particularly preferred embodiment provides a four-virtual wheeled configuration, as shown in FIG. 7: a set of two virtual wheels 702a, 702b connected by an axle 701a, 701b in the front and the rear. Additionally, embodiments of the invention having no axles are also possible, because, when using virtual wheels, there is no requirement for an axle, thus giving more latitude in the configuration of wheels. In addition to a transverse two-virtual wheel configuration (FIG. 10), FIGS. 8-11 show other wheel configurations. The "wheels" 80-110a shown represent the effective diameter of the virtual wheel; the "footprints" 80b-100b show that actual size of the contact surface of the foot, dramatically illustrating the principle that the invention is capable of providing a set of very large effective-diameter virtual wheels without the typical consequences of high weight, cost, and mechanical challenges that conventional large wheels bring with them.

Figure 8:
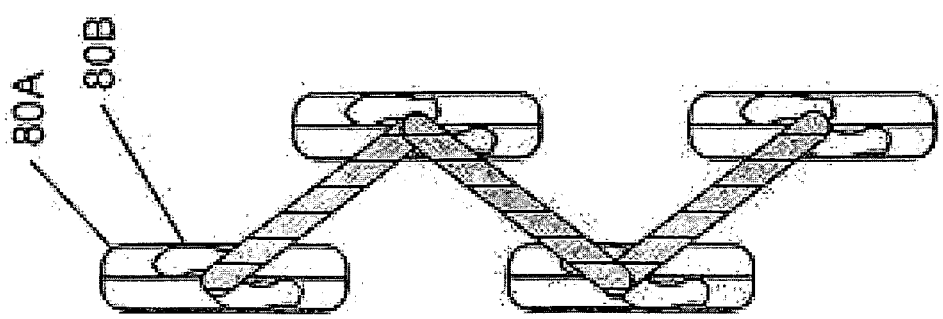

One option is to stagger the virtual wheels on the left and right sides of the vehicle, shown in FIG. 8, which significantly increases stability in rugged terrain. Another is to place a single virtual wheel in front, as in FIG. 11, or in front and back ends of the vehicle, as in FIG. 9, providing additional points of contact with the ground, as well as potentially alerting users to dangerous or uneven terrain before the bulk of the payload gets to that spot.

Figure 12:
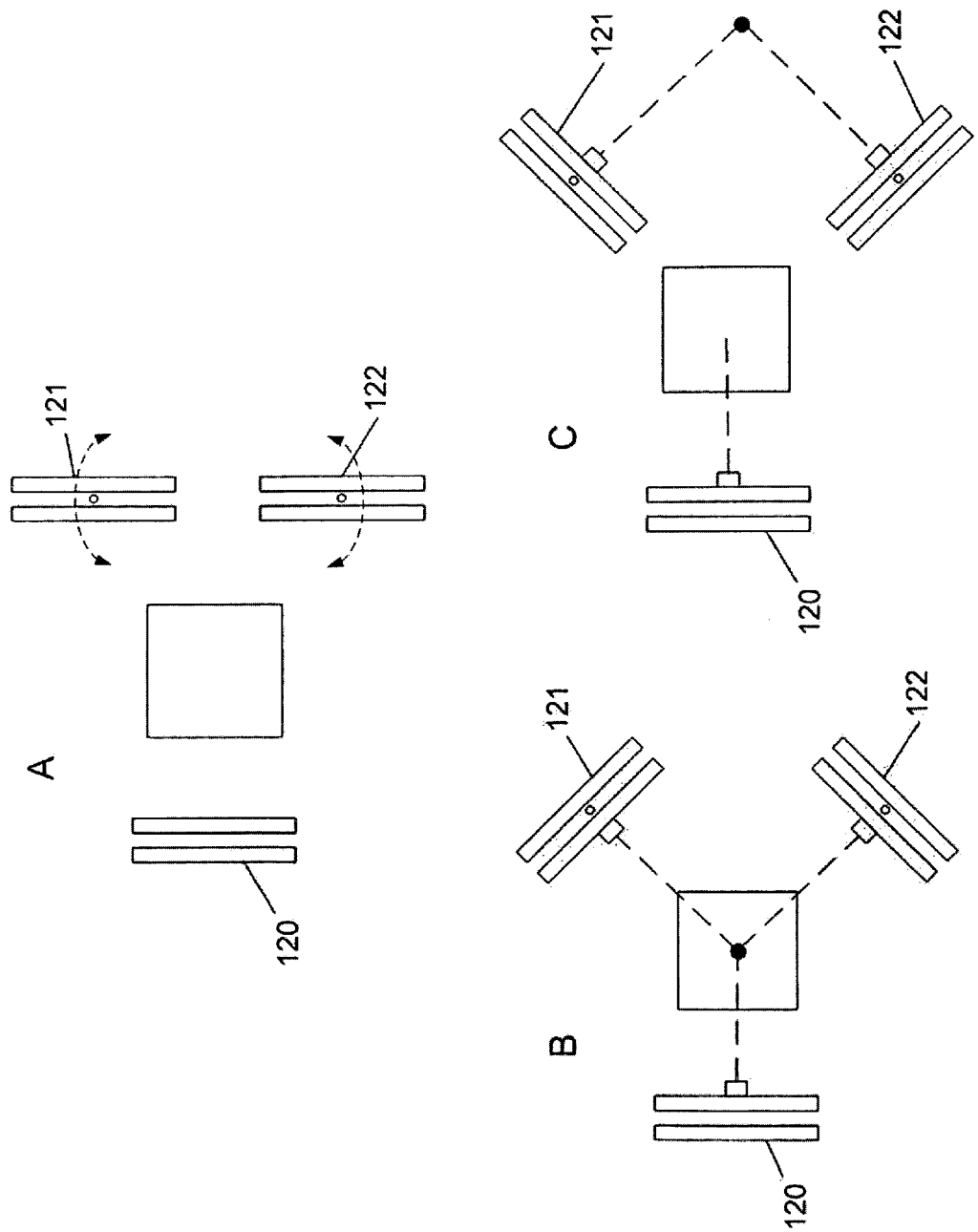
FIG. 12 shows a schematic diagram of a three-virtual wheel configuration for a vehicle according to the invention.

A three-virtual wheeled configuration is also possible. FIG. 12 provides a schematic diagram depicting a three virtual-wheeled configuration having one fixed virtual wheel 120 and two pivoting virtual wheels 121, 122. FIG. 12 illustrates the flexibility provided by such a configuration, wherein it is possible to provide a vehicle that turns about substantially any point. As indicated by the caption 'straight' in FIG. 12a, the vehicle is proceeding in a straight line, with each of the virtual wheels oriented parallel to each other. As shown in FIGS. 12b and c, the pivoting virtual wheels, in order to turn about any point, are oriented such that the virtual wheels are perpendicular to a straight line bisecting the virtual wheel from the center of rotation; that is, the point about which the vehicle is turning. Therefore, as in FIG. 12b, where the center of rotation is the vehicle center itself, the virtual wheels are perpendicular to a line originating from a center of rotation fixed at the center of the vehicle. Such position allows the vehicle to spin in place. In FIG. 12c, the pivoting virtual wheels are perpendicular to a line originating at an external center of rotation, allowing the vehicle to turn about an exterior point. Preferably, the virtual wheels are capable of rotating in both forward and backward directions, allowing the vehicle to rotate in both counter- and clockwise directions without intermediate reorientation of the virtual wheels.

Additional variations on the basic vehicle include very high clearance vehicles having large diameter virtual wheels. One embodiment of the invention provides such a vehicle having a four-virtual wheeled configuration. Other possible embodiments include longer vehicles having multiple virtual wheels that can carry large payloads, equivalent to big rigs, which can be used where no roads exist.

Foot Design

Figure 14:
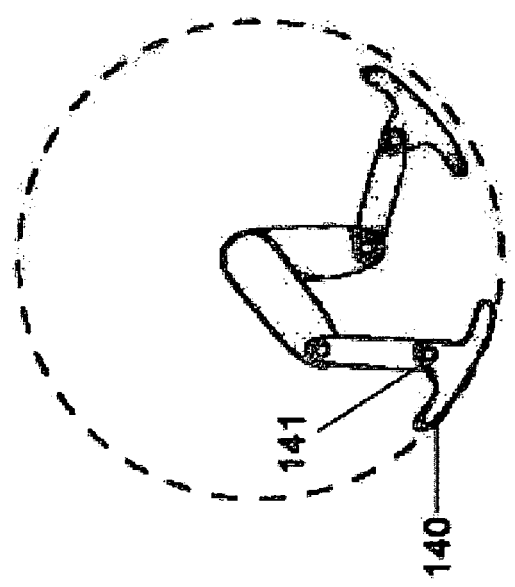
FIGS. 13-16 depict alternate embodiments of the leg portion of a virtual wheel according to the invention.
Figure 16:
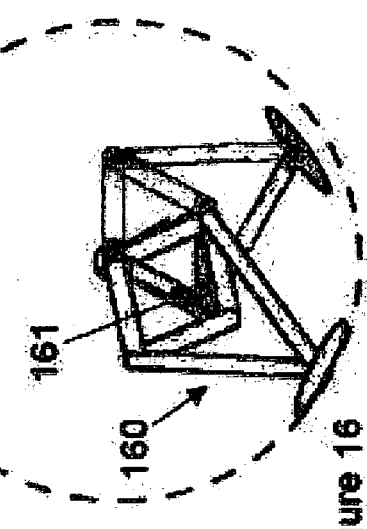
Figure 13:
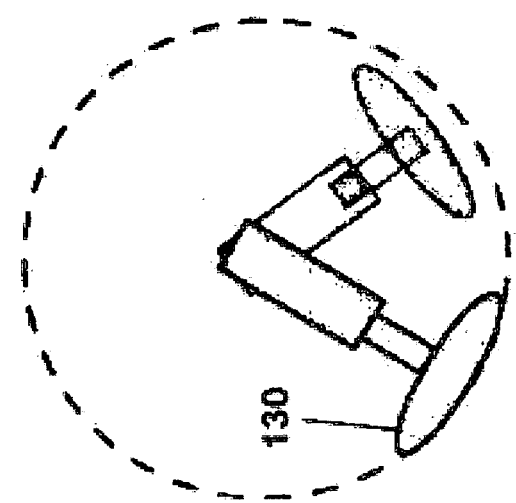
Figure 15:

In one embodiment of the invention, the feet 202 of the legs 201 of the virtual wheel form the arc of a circle. Such a foot is advantageous because it simplifies control and movement of the foot, and provides the smallest possible point of contact. However, additional versions of the foot are possible. Alternate embodiments of the foot include footpads 130, 140 adapted to a variety of surfaces as shown in FIGS. 13 and 14. The footpad 140 pivots on a joint 141. Additionally, a scimitar foot 150 would allow the virtual-wheeled vehicle to navigate extremely rugged terrain, with a simple design. An additional embodiment of the foot 160 provides a shock absorber 161 mechanism. Still further embodiments of the invention are possible, wherein characteristics of the just-described embodiments are combined; for example an embodiment providing a pivoting scimitar foot is possible.

The Leg Movement Mechanism

Figure 17:
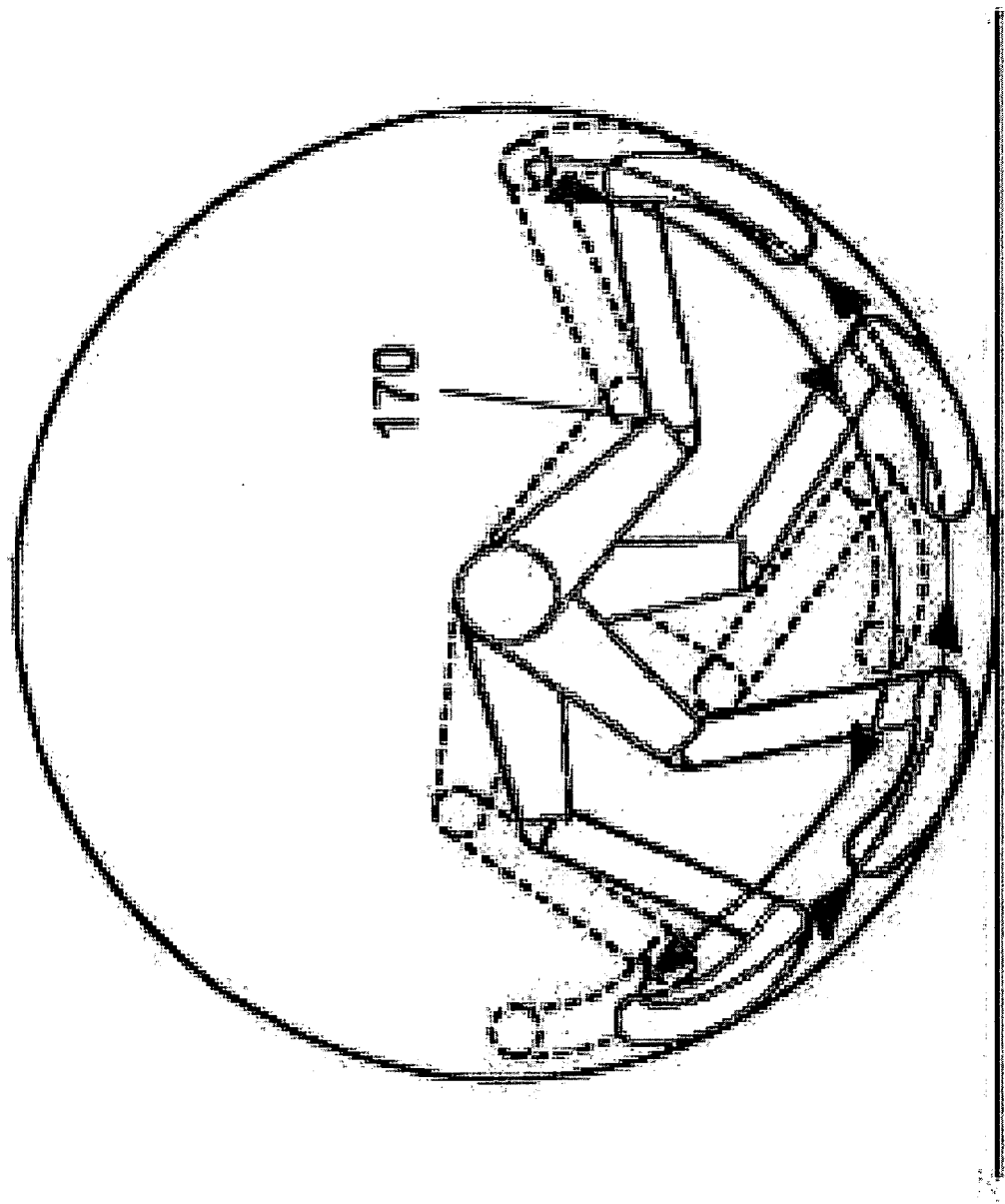
FIG. 17 illustrates the stepping motion in a virtual wheel based on a leg that is jointed at the knee according to the invention.
Figure 18:
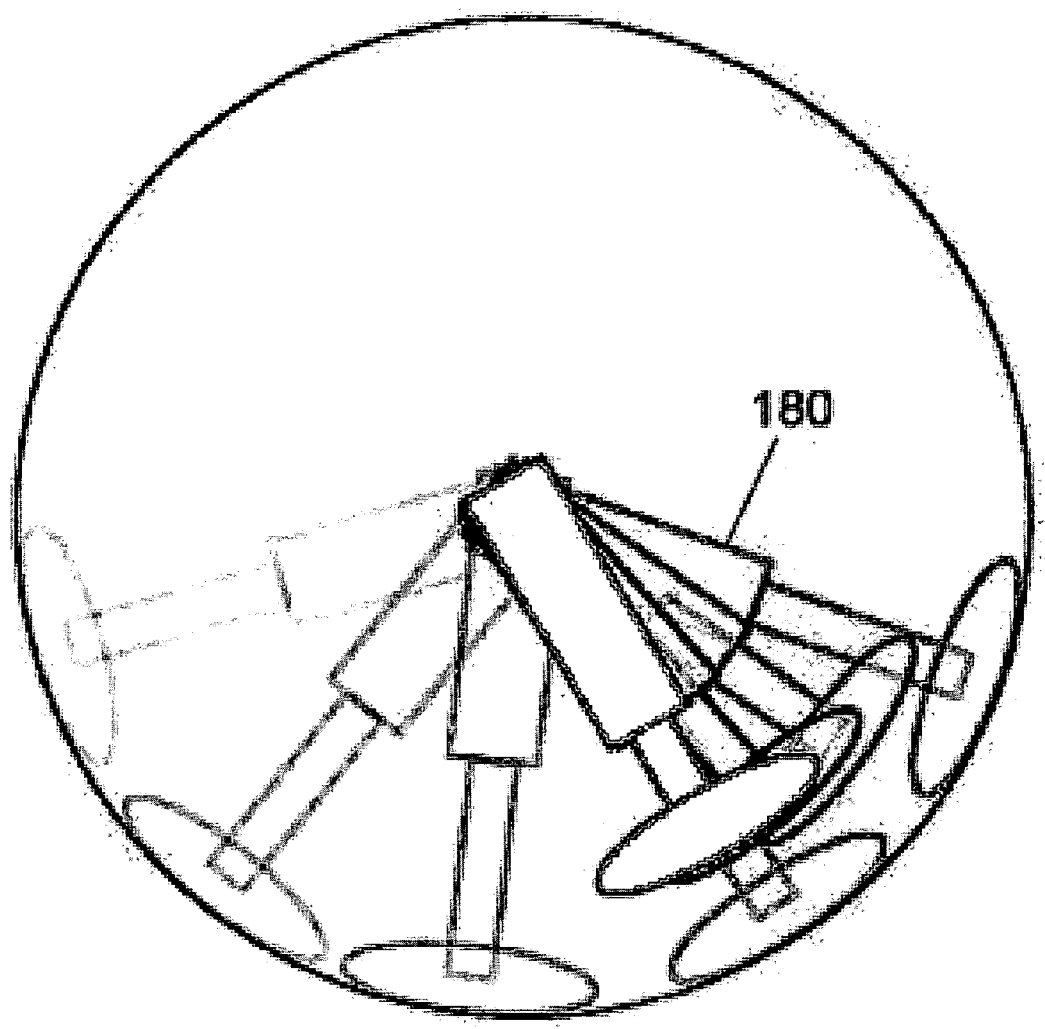
FIG. 18 illustrates the stepping motion in a virtual wheel based on a telescoping leg according to the invention.

The use of a leg pair to simulate a wheel brings with it the need to lift the leg off the ground and move it forward and, potentially, backward. Because the motion of the swinging leg can be largely passive, a simple mechanical design is well suited for the task. As shown in FIG. 3, an assembly 301 of joints and hinges facilitates leg movement. Movement could also be provided through the use of a simple pantograph mechanism. While a preferred embodiment of the invention uses a simple approach, embodiments utilizing more complex approaches may be warranted by the demands of deployment environment. For example, the embodiment of FIG. 17 uses jointed knees 170. A further embodiment, shown in FIG. 18, provides a telescoping leg 180 that relies on a piston. While pistons and joints impose greater repair and maintenance burdens, the demands of the environment of use may offset the greater burdens. In the embodiment of FIG. 6, the vertical movement of each leg is independently controlled by a servo actuator that is mounted onto the leg.

Steering Options

One embodiment of the invention incorporates "all-wheel" steering as shown in FIG. 19. The vehicle 190 has two axles 191a, b, each one having transversely mounted thereon two virtual wheels 192a-d. As shown, the steering system works by moving the individual virtual wheels, wherein a pivot point is provided for each of the four virtual wheels. Alternatively, as in FIG. 20, the axles 201a may be interconnected using pivots 202a, b that allow two front wheels to be steered together. Moreover, as shown in FIG. 21, an embodiment of the invention is possible that incorporates articulated steering. A vehicle incorporating articulated steering is split into front and rear halves 211a, b that are connected by a central pivot 212. The front and rear halves are connected with one or more actuators that change the angle between the halves, including the front and rear axles and the virtual wheels, thus steering the vehicle. An articulated vehicle provides additional maneuverability benefits. For example, by articulating a vehicle it becomes possible to dynamically lengthen and shorten the wheelbase of the vehicle. Such a vehicle has a telescoping structure with an actuator and an articulating joint in the center. The provision of an articulating joint with the proper actuators enables production of a vehicle that can arch upward, forming a triangle, which can alternately flatten and contract.

The two-virtual-wheel design having two virtual wheels mounted in a transverse fashion, may be steered by counter-rotation of the wheels, increasing maneuverability. For example, a steering system may be implemented that works by moving the individual wheels, as shown in FIG. 23. Alternatively, as in FIG. 22, the axles 220 may be interconnected using a pivot 221 that allows the two wheels to be steered together. Finally, even finer control of steering may be provided by sidestepping each pair to allow for wide latitude in the vehicle's movement. As shown in FIG. 6, the two legs of a leg pair, may be connected to the body through the use of concentric shafts.

The steering algorithm of the control software allows fine control of turns, as well as the ability to change the centre of gravity on the fly. This allows the user to control the stability and the movement of the vehicle much more closely.

Load Balancing

The demand placed on robotic vehicles in field situations is a function of the type of load to be carried, the trail conditions and the terrain to be traversed. For example, it is possible to encounter narrow winding trails in one stretch, and uneven slopes in another. The vehicle needs to adapt to these conditions rapidly, dynamically balancing the load to adjust to conditions. Just as a mule tries to balance as it walks, high-level control software compensates for changes to the terrain that are encountered, for example stepping on a rock or negotiating an obstacle. A variety of mechanisms for accomplishing this are possible. First, as shown in FIG. 24, the effective diameter of the virtual wheel may be dynamically altered, as in FIG. 24a. FIG. 24b shows the effect of altering effective diameter of a virtual wheel-because of the size differential between the two wheels, the axle and chassis of the vehicle are kept level, in spite of the sloped terrain, thus keeping the load level and balanced, and improving the traction on uneven ground. Additionally, providing a non-circular foot clearance improves traction still further. An additional means of load balancing involves pivoting the axles of the vehicle to suit the terrain slope, as shown in FIG. 25. Still another mechanism of load balancing involves shifting the load itself to maintain balance, as shown in FIG. 26. One of ordinary skill will readily appreciate that the above mechanisms are implemented by actuators under high-level software control. Additionally, the invention may incorporate any or all of the above load-balancing mechanisms.

Human-Assisted Mode of Operation

Figure 27:
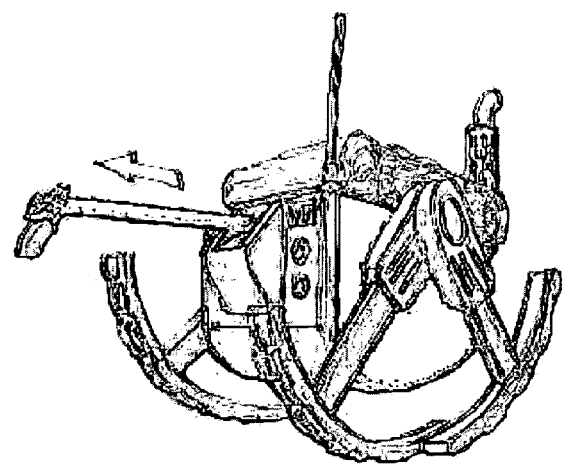
FIGS. 27-29 show a human-assisted mode of operation of a robotic mule according to the invention.
Figure 28:
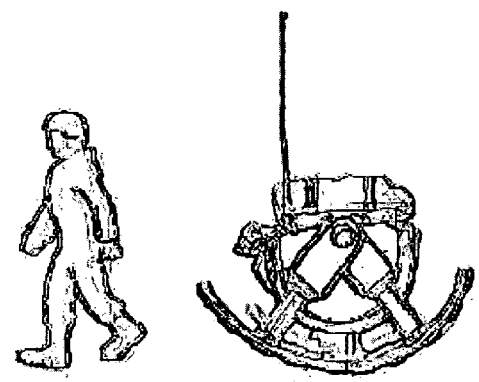
Figure 29:
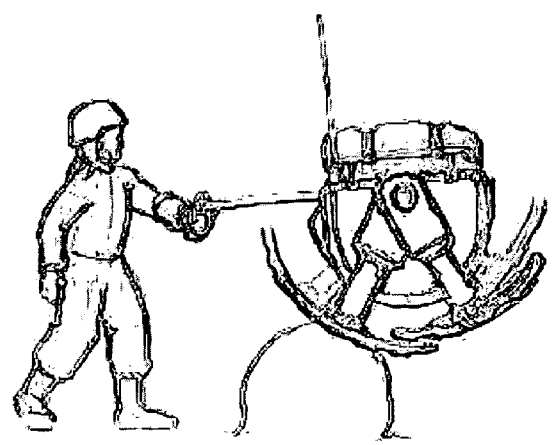

The capabilities of a transverse two-virtual-wheel robotic vehicle such as a mule can be increased dramatically by allowing a human to assist the vehicle in certain situations, such as clearing a large obstacle or climbing a steep slope. As shown in FIG. 27, one embodiment of the invention preferably includes a simple handle on the vehicle that is normally unused, but when particularly difficult terrain is encountered, can be used by a human to assist the vehicle for a short period of time. As shown in FIG. 28, under normal conditions, the vehicle is self-powered, requiring no assistance. However, as in FIG. 29, a human can assist the vehicle, extending its capabilities.

Clustering of Vehicles

When small, flexible, maneuverable vehicles such as robotic mules use virtual wheels, several creative solutions to terrain problems are possible. One is to cluster two or more vehicles together to perform specialized tasks. For example, consider two two-virtual-wheel vehicles that are of a transverse design. By connecting them together, and placing a pack across them, a four-wheeled "stretcher bearer" vehicle is created when the occasion demands it, while at other times the individual vehicles can take up a smaller footprint. Similarly, if a particularly steep trail presents itself, or a large obstacle needs to be climbed over, a number of vehicles may be connected together to form a "train" that could negotiate such terrain more easily. Any loss of traction in one place is compensated for by the other vehicles in the train.

Control

One embodiment of the invention is controlled by software executing on an external processor 433 that interfaces with an on-board processor 204, 431 such as a microcontroller. Independent servomotors controlled by the on-board processor, in turn control the leg pairs of the virtual wheels, with high-level control ultimately being performed by the externally running software, communicating wirelessly with the vehicle.

Figure 30:
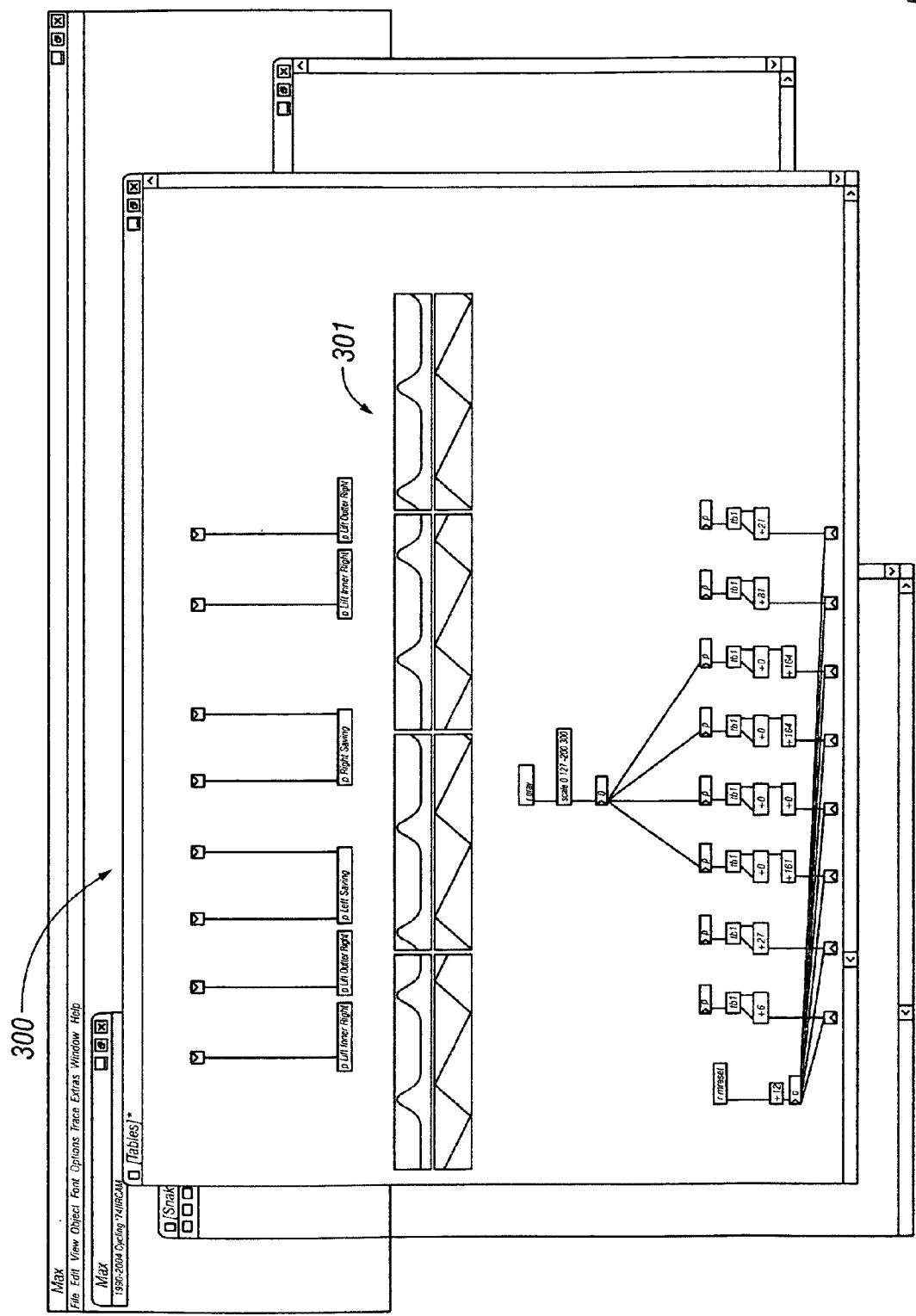
FIG. 30 is a screen shot of a user interface depicting wave forms that control individual legs of the virtual wheel on a robotic mule according to the invention.
Figure 31:
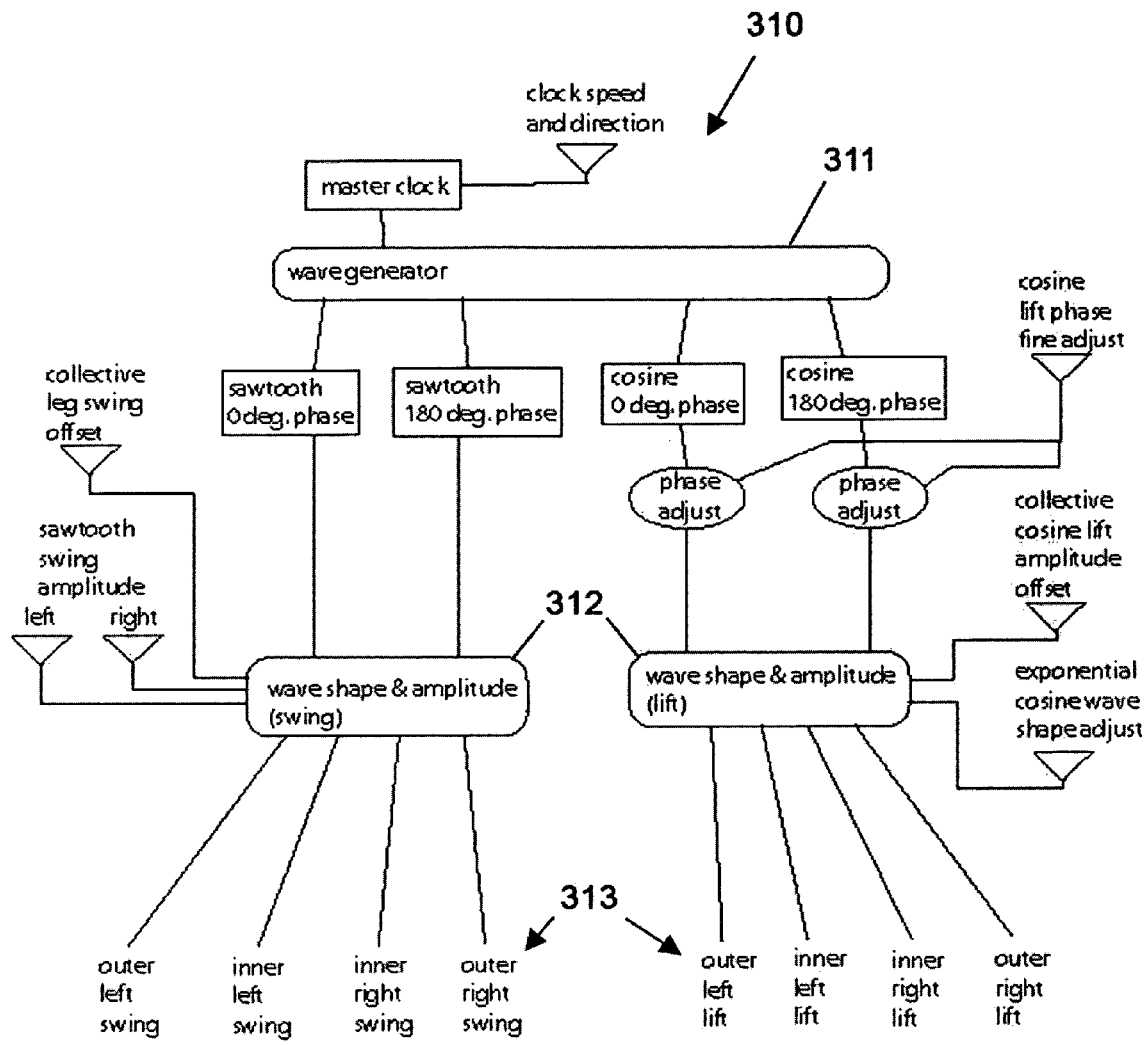
FIG. 31 provides a software control flowchart for a robotic mule according to the invention.

The control software, performing the function of a central pattern generator (CPG), algorithmically generates waveforms that activate the leg pairs of the virtual wheel in a coordinated manner. FIG. 30 provides a screen shot of a user interface 300 to the control software that shows the waveforms 301 that control the individual legs. FIG. 31 shows a software control flowchart 310 for a vehicle according to the invention. As shown, a central generator 310 generates the waveforms 312 that control lift and swing in the individual legs 313. Additional software inputs include control signals to the servomotors controlling the legs. By means of these inputs, the control software independently controls locomotive parameters including body swing, ride height, and step length. The control software also allows macro commands to be sent to the vehicles to carry out standard tasks, such as "Start", "Stop", and "Turn". It further considers the environmental conditions that are critical to the functioning of the vehicle, such as terrain surface, gradient, obstacles, and the like. Environmental data in turn serve as inputs to dynamically modify the central pattern generator.

Another embodiment of the invention is possible wherein the above control functions are performed by logic circuits combined and configured to perform such functions. Moreover, an embodiment of the invention is possible where an onboard processor performs control functions, eliminating the necessity for an off-board processor. Additionally, an embodiment of the invention is possible wherein the control algorithms are adaptive, allowing the vehicle to function autonomously or semi-autonomously.

Figure 32:
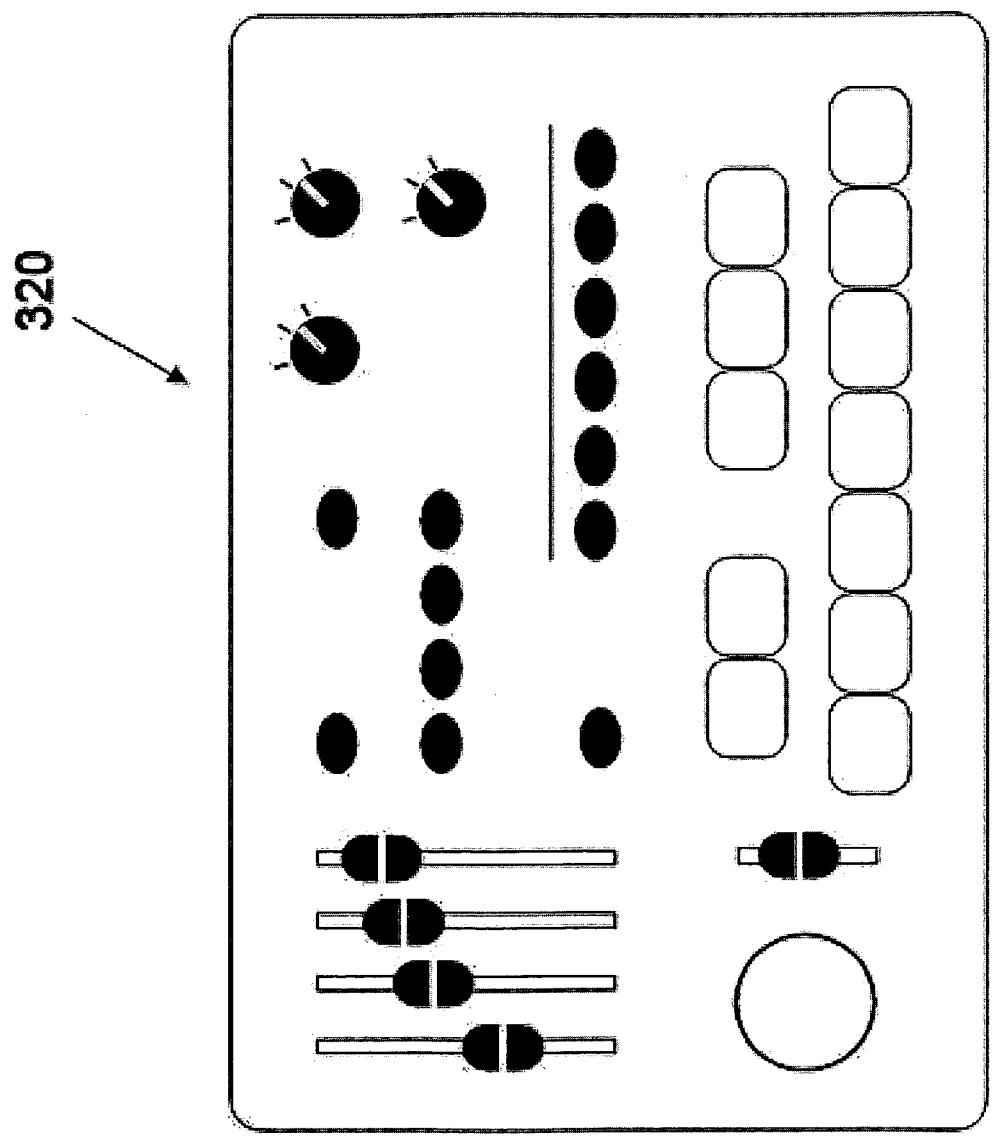
FIG. 32 shows a user input device to a controller in a robotic mule according to the invention.

A further embodiment of the invention is under the manual control of the user. In such embodiment, the user controls the vehicle by activating user inputs on a control device 320 such as that shown in FIG. 32.

Conversion Between Walking and Rolling Modes

A further embodiment of the invention provides a bimodal conveyance mechanism for the foregoing virtual-wheeled vehicles. While virtual-wheeled motion is ideal for movement across irregular terrain, true rolling movement remains the most efficient mode of conveyance over regular terrain. Accordingly, the current invention provides a conveyance mechanism that is readily convertible between walking and rolling modes. Because the conveyance mechanism is readily converted between modes, vehicles equipped with the conveyance mechanism are able to function effectively in an even greater range of deployment settings. Although the bimodal conveyance mechanism is described herein in relationship to robotic vehicles, such as mules, its deployment is not limited to such vehicles. Any land vehicle equipped with the bimodal conveyance mechanism will benefit in a similar fashion.

In its simplest form, the bimodal conveyance mechanism consists of two members 331, 332, each pivoting about a common primary axle 333, as shown in FIG. 33A. At the distal end of each member is a foot 334A or 334B subtending a 180° arc having a radius comparable to the distance from the primary axle to the foot. The radius may be varied by extension of a linear actuator along the radial portion 335—the leg—of the members. As the members pivot about the primary axle, the two feet 334a, b rotate in parallel planes, offset from one another along the length of the primary axle, as shown in FIG. 33b. Appropriately combined with the linear extension motion, this allows the members to provide a virtual wheel walking motion as in the foregoing description.

Figure 33:
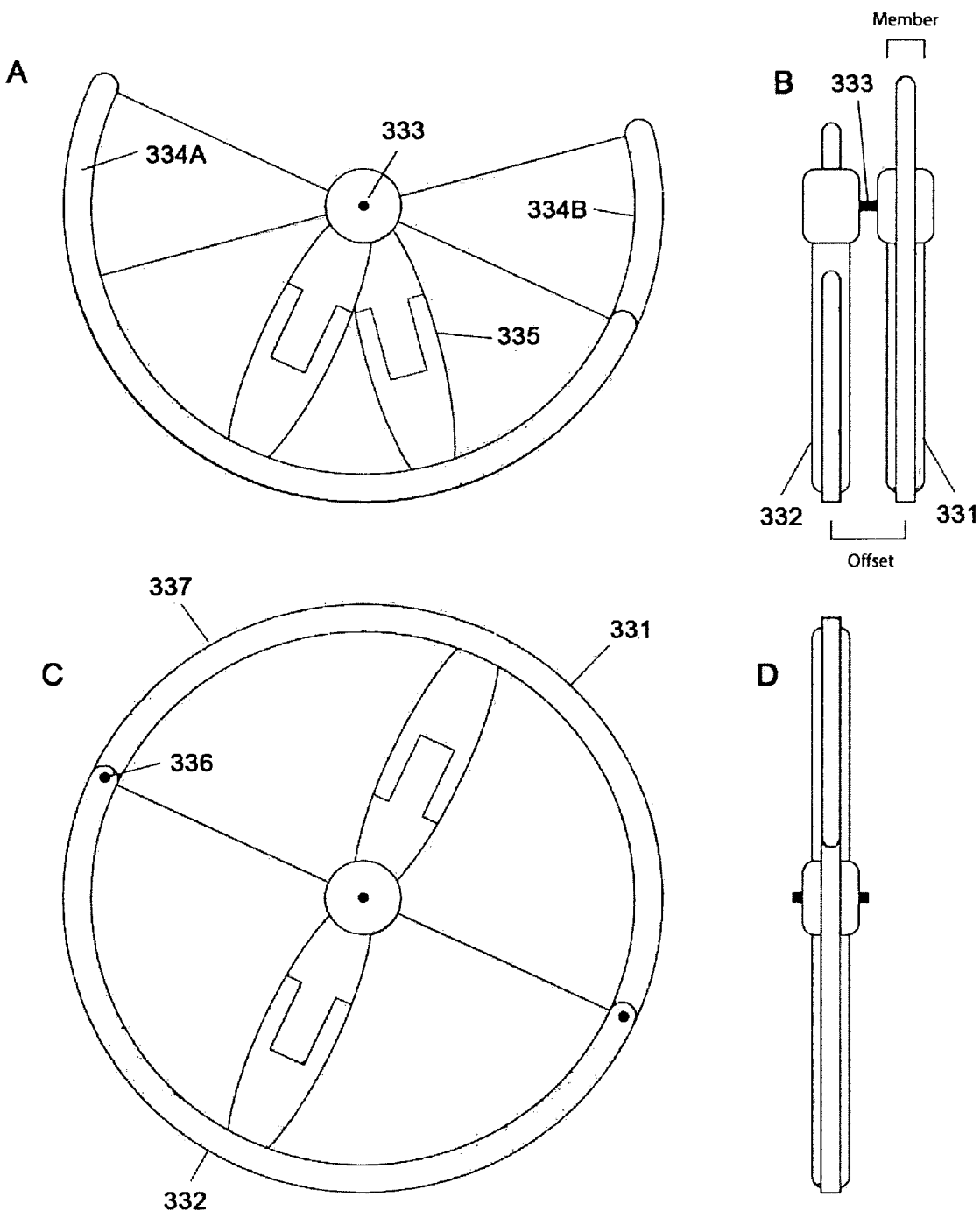
FIG. 33 is a schematic representation of an embodiment of a virtual wheel illustrating conversion from a walking to rolling configuration according to the invention.
Figure 34:
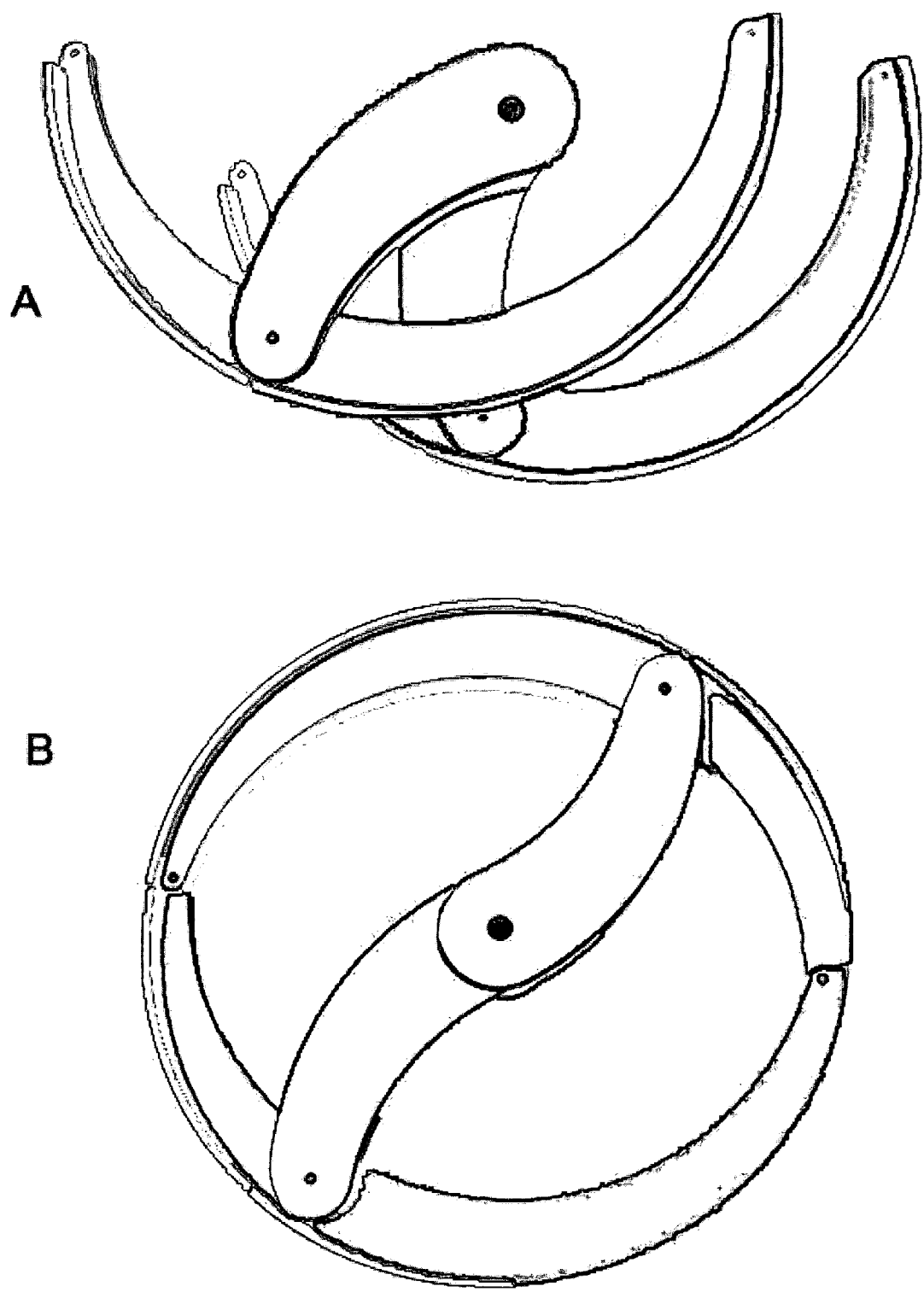
FIG. 34 depicts conversion between walking and rolling configurations in the preferred embodiment of the virtual wheel according to the invention.

The mechanism of FIG. 33a and b, after a simple reconfiguration, can also provide rolling conveyance, as shown in FIG. 33c and d. To configure the mechanism for rolling, the members 331, 332 are rotated about the primary axle 333 such that they are diametrically opposed to one another, as in FIG. 33c. The members are then configured such that the feet are positioned in a common plane, as in FIG. 33d, eliminating the offset along the primary axle present in the walking configuration. The leading edge of one foot is then fastened 336 to the trailing edge of the other foot, and vice-versa, such that the feet form a rigid, planar circle 337 about the primary axle. The circle formed by the feet then serves as a rolling surface. FIG. 34 shows the reconfiguration as performed for the preferred variation of the invention, wherein FIG. 34a shows walking mode and 34b shows the conveyance mechanism reconfigured to rolling mode.

The elimination of the offset described above can be performed in several ways. In the simplest method, one or both of the members are shifted along the primary axle until the feet are coplanar, as shown in FIG. 33. In this approach, the portions of the members that engage the primary axle—the hubs—must be shaped to also engage one another as the feet are moved into a coplanar configuration. Preferably, the hubs are further designed to rigidly lock to one another, providing the diametric spoke that spans the resulting wheel with increased structural stability. FIGS. 35a, b show the hubs 353 of FIGS. 34a, b in offset 351 and engaged 352 configurations.

Figure 36:
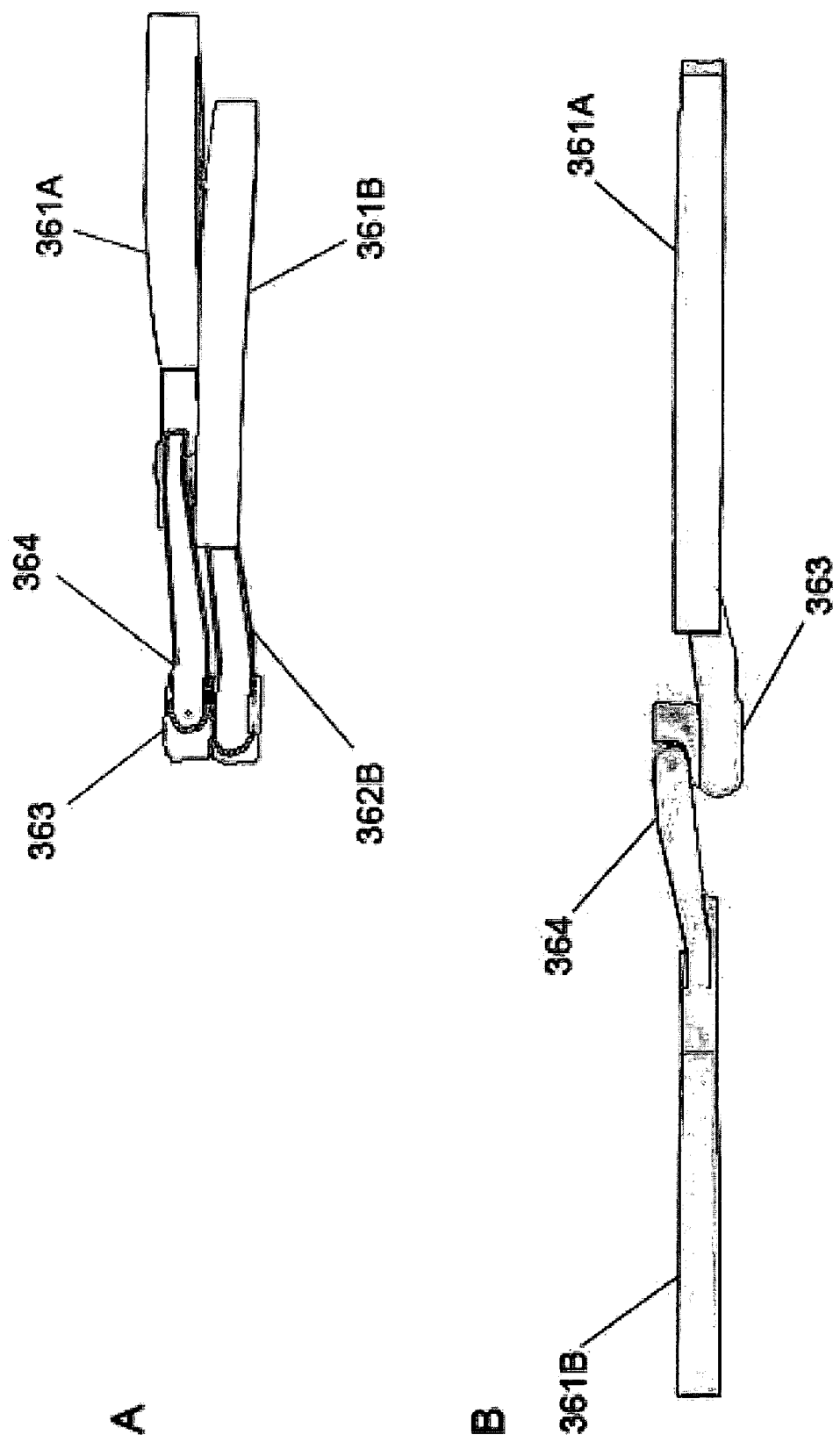
FIG. 36 shows an alternate assembly for eliminating offset between the members of a virtual wheel according to the invention.

In another approach, shown in FIG. 36, the radial portion 362, b of each member is shaped to offset the foot 361a, b relative to the hub 363. Additionally, the connection of at least one member to the hub is via a hinged yoke 364. In the walking configuration (FIG. 36a), the radial portions of the members are oriented such that the offsets position the feet in offset planes, allowing for walking motion. In converting to the rolling configuration (FIG. 36b), one or both of the members 361a, b are flipped about the primary hinge 363 using the hinged yoke 364, inverting the direction of the offset provided by the member, and positioning the feet in a common plane.

Figure 37:
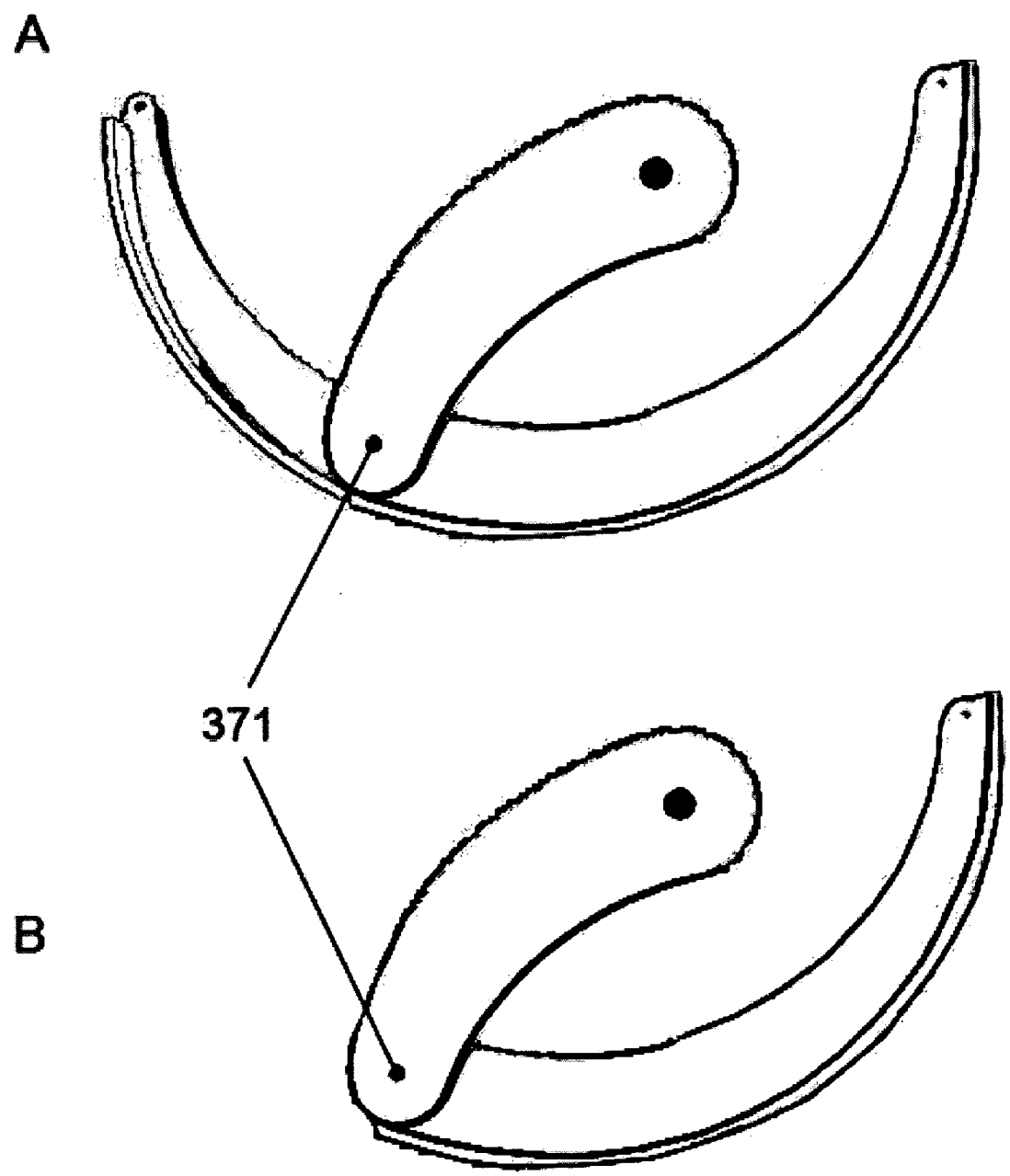
FIG. 37 shows an embodiment of a virtual wheel having a hinged foot according to the invention.

As noted in the foregoing description, a primary advantage of virtual wheels over conventional wheels is a lower vehicle profile. The 180° subtended by the feet in FIG. 33 is more than is necessary for proper functioning of the two members as a virtual wheel. Accordingly, the profile of the mechanism (and therefore the overall vehicle) can be reduced by shortening the arc subtended by the feet when in the walking configuration. To this end, an additional hinge 371 may be provided along the arc of the foot. As shown in FIG. 37, this hinge allows the foot to fold into an arc subscribing less than the 180° required for two feet to completely define a wheel perimeter (FIG. 37a).

Figure 38:
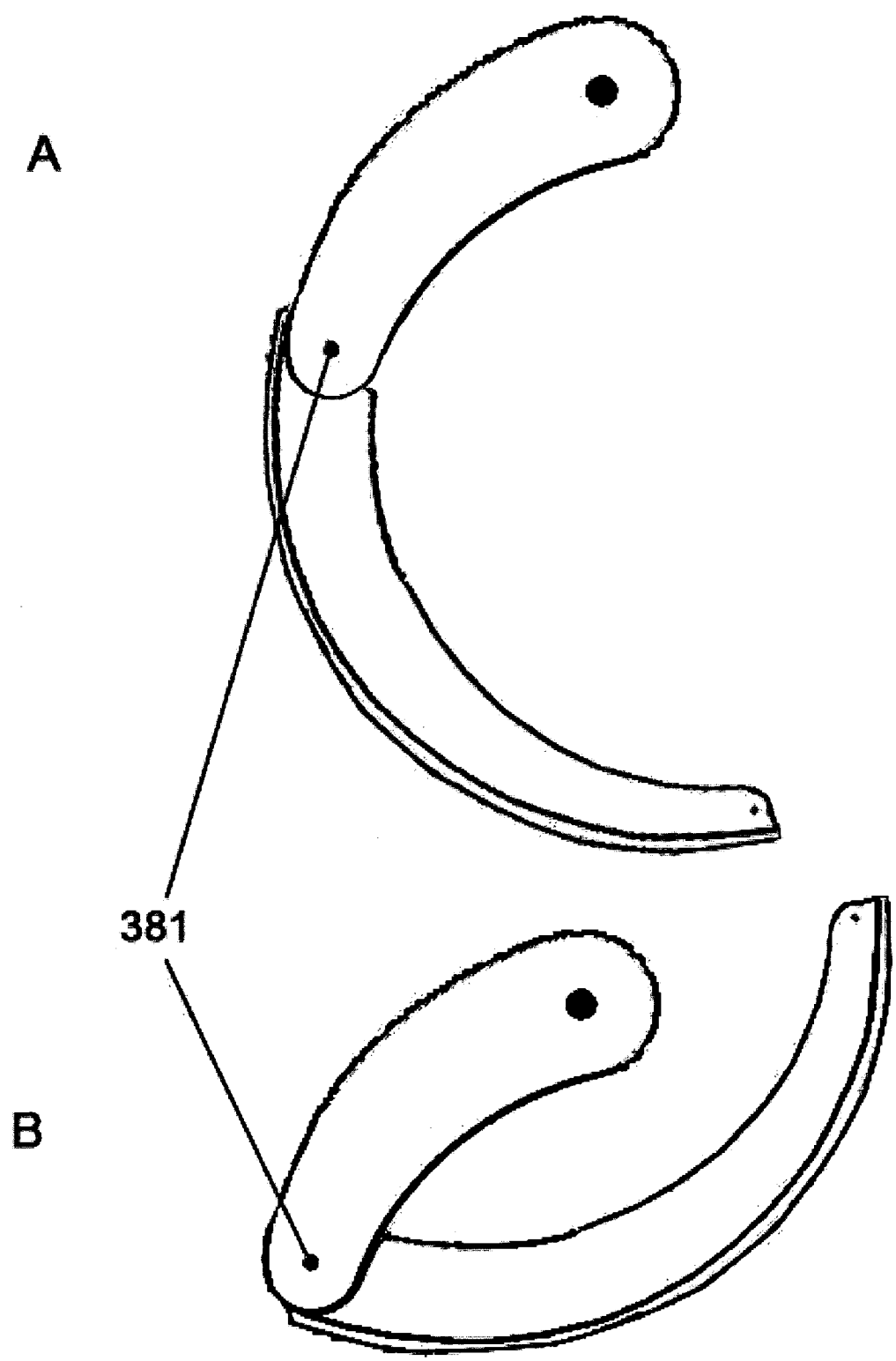
FIG. 38 shows an embodiment of a virtual wheel having a hinged knee according to the invention.
Figure 39:
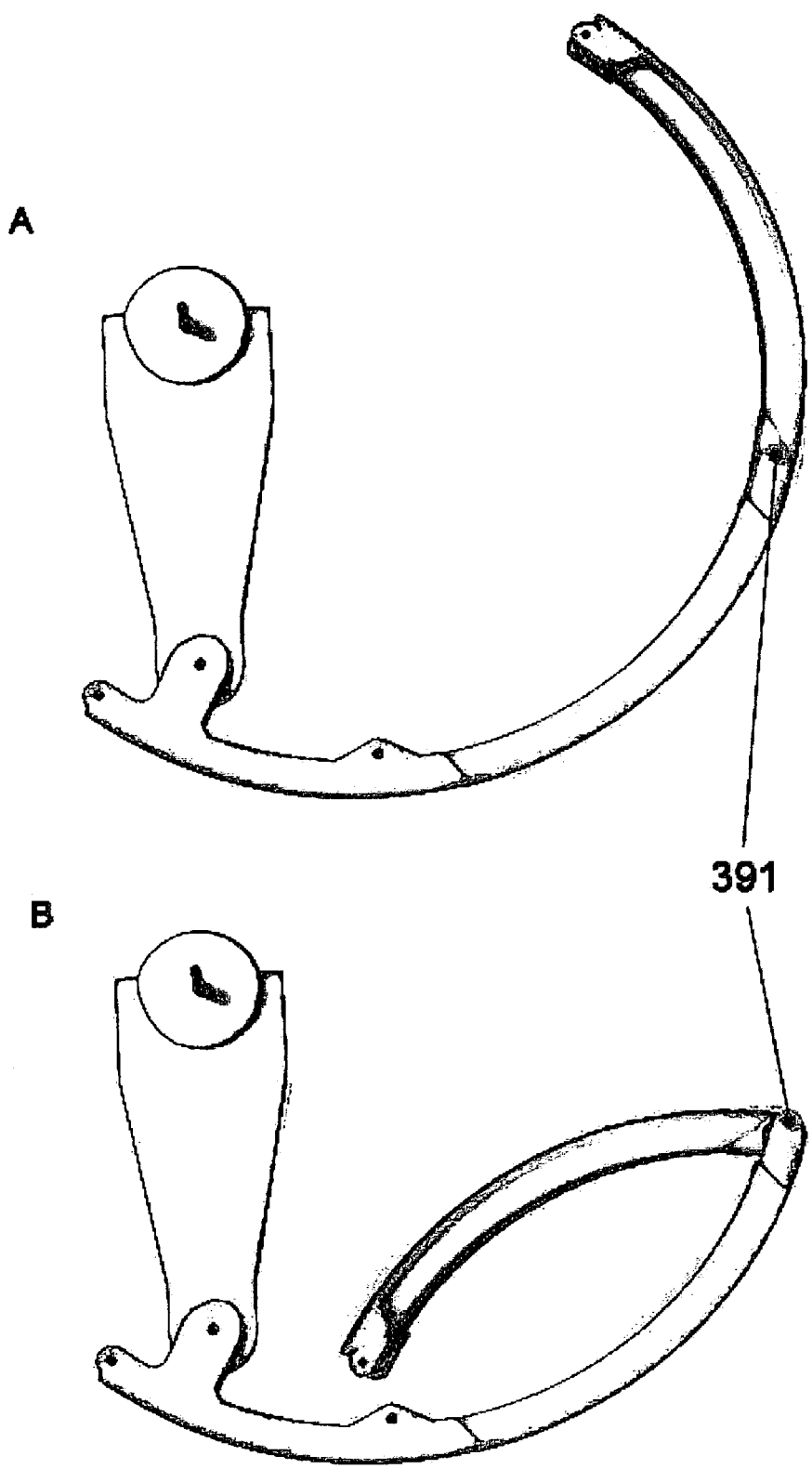
FIG. 39 shows an embodiment of a virtual wheel having a foot hinged at a point separate from the knee hinge according to the invention.
Figure 40:
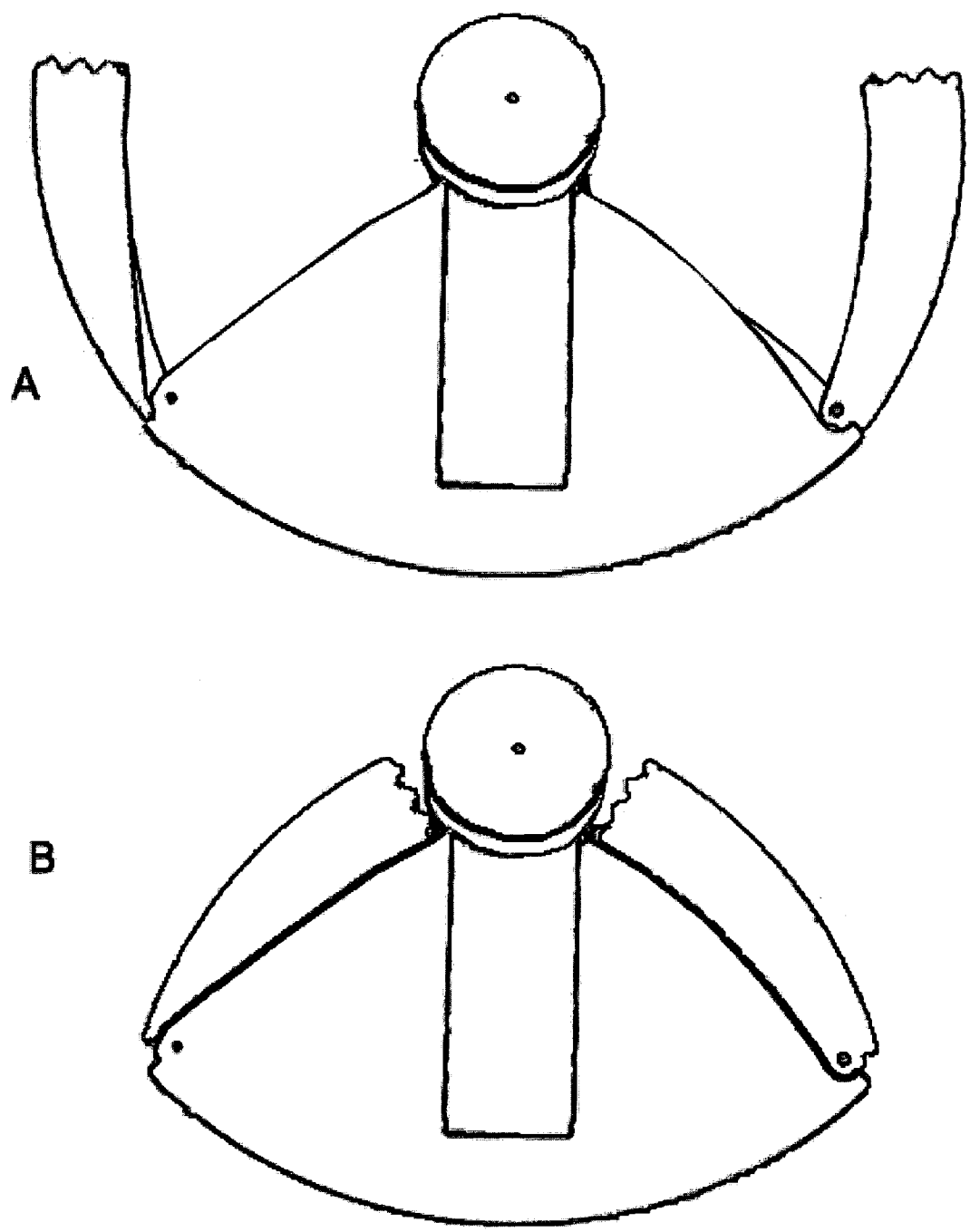
FIG. 40 shows an embodiment of a virtual wheel having a multiply-hinged foot according to the invention.

In some variations of the invention, the foot is connected to the leg at the knee hinge 381, allowing the foot to pivot relative to the leg. As shown in FIG. 38, this motion provides an alternative (or and addition to) the linear extension of FIG. 33. Preferably, the hinge allowing the foot to fold to an arc less than 180° is the knee hinge, as shown in FIG. 37. However, this need not be the case, as is shown in FIG. 39, wherein the foot folds at a hinge 391 separate from the knee hinge. Also, it is possible to provide more than one hinge along the arc of the foot, as shown in FIG. 40a, b—rolling mode and walking mode, respectively. Note that in this variation the use of two symmetrical foot folding hinges mandates the use of linear extension motion—knee hinges provide an appropriate walking motion only for asymmetric feet.

In addition to providing both walking and rolling configurations, the invention provides substantial stowing capability for the wheels of a purely rolling vehicle. As shown in FIG.

Figure 41:
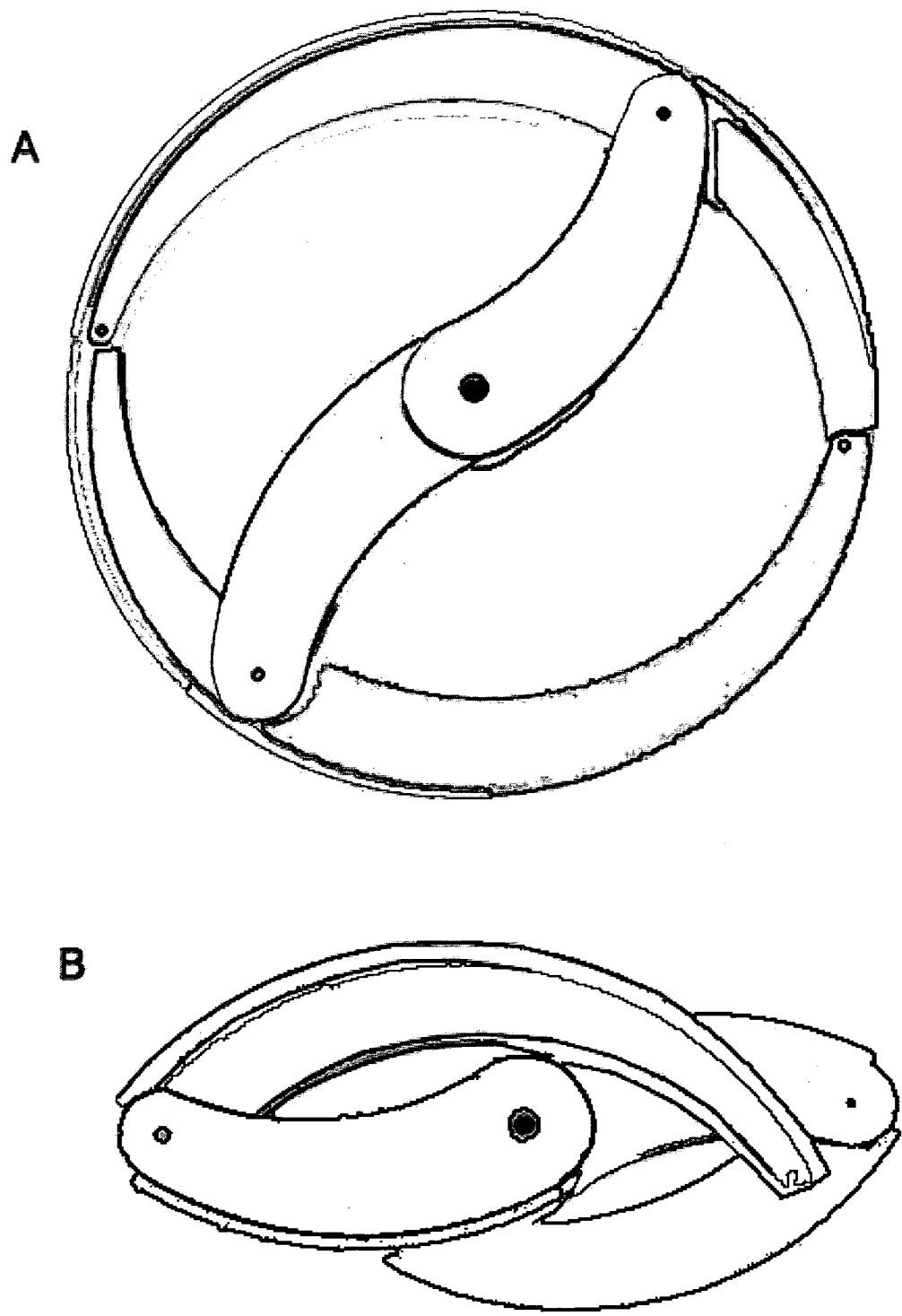
FIG. 41 contrasts a virtual wheel in rolling configuration with one fully stowed according to the invention.

41, the profile of the mechanism in a fully stowed (FIG. 41*b*) configuration is considerably smaller than when in a rolling configuration (FIG. 41*a*) This characteristic may be useful in vehicles that must be stowed for deployment in remote locations, including outer space.

The invention can be easily extended to more than two members. For an n-member mechanism, each foot must subtend 360°/n. Additionally, at least one hub must be shaped to allow engagement with hubs from both sides.

In those variations that need only utilize the collapsing ability of the wheels—purely rolling vehicles, the pivoting motion about the primary axle may be eliminated. A substantial reduction in size can be achieved using the knee hinge and foot folding hinges alone during the stowing operation.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A conveyance mechanism comprising:
   a pair of radial members, each member having a curved foot attached to a distal end, wherein said curved foot subtends an arc of approximately 180°, the radius of said arc approximating the length of said members, each member attached to a common axle at a proximal end;
   wherein said members pivot freely about said axle so that said feet rotate in parallel planes to each other in a walking mode; and
   wherein said feet are configured to attach to each other in a common plane to form a circle in a rolling mode.

2. The mechanism of claim 1, wherein any of said members and said feet are jointed so that said circle is collapsible to a stowing mode.

3. The mechanism of claim 1, wherein maintaining an offset between said feet enables them to rotate in parallel planes, and wherein eliminating said offset allows them to be attached in a common plane.

4. The mechanism of claim 3, said members are offset from each other along said axle when said feet are offset from each other.

5. The mechanism of claim 3, wherein each proximal end includes a hub. includes a hub.

6. The mechanism of claim 5, wherein said hubs are shaped to engage each other as the feet are moved into a coplanar configuration.

7. The mechanism of claim 6, wherein the hubs are shaped to lock to one another rigidly so that said members form at least one rigid diametric spoke.

8. The mechanism of claim 5, wherein a radial portion of each member is shaped to offset the foot relative to the hub.

9. The mechanism of claim 5, wherein said member is connected to said hub by a hinged yoke.

10. The mechanism of claim 9, wherein a radial portion of each member is oriented so that the offset positions the feet in different planes, allowing for a walking motion.

11. The mechanism of claim 9, wherein said members are flipped about the axle using the hinged yoke so that direction of said offset is reversed, and wherein said feet are positioned in a common plane, allowing for a rolling motion.

12. The mechanism of claim 1, wherein said foot includes at least one hinge.

13. The mechanism of claim 12, further comprising a hinge along the arc of at least one foot, wherein said hinge allows said foot to fold into an arc subscribing less than 180°.

14. The mechanism of claim 1, wherein a connection between a member and a foot is hinged, allowing said foot to pivot relative to said member.

15. The mechanism of claim 1, wherein said feet have attachment elements at their leading and trailing edges for ,
   attaching a trailing edge of a first foot of asequenee said pair of feet to the leading edge of a next foot of said pair a sequence of feet; and
   attaching the leading edge of said first foot to the trailing edge of the last foot;
   wherein a rigid coplanar circle is formed.

* * * * *